United States Patent [19]

Izawa et al.

[11] Patent Number: 4,964,039

[45] Date of Patent: Oct. 16, 1990

[54] APPARATUS FOR PROCESSING CODE DATA ASSOCIATED WITH MANAGEMENT DATA INCLUDING IDENTIFICATION DATA

[75] Inventors: Koji Izawa; Shiro Takagi, both of Yokohama; Tadanobu Kamiyama, Yokosuka, all of Japan

[73] Assignee: Kabushiki Kaisha Toshiba, Kawasaki, Japan

[21] Appl. No.: 243,867

[22] Filed: Sep. 13, 1988

[30] Foreign Application Priority Data

Sep. 14, 1987 [JP] Japan .............................. 62-230027

[51] Int. Cl.⁵ .............................................. G06F 1/00
[52] U.S. Cl. .................................. 364/200; 364/248.1; 364/249.4; 364/236.2; 364/232.7
[58] Field of Search ..................... 364/200, 300, 900; 371/21, 24, 71

[56] References Cited

U.S. PATENT DOCUMENTS 4,604,653  8/1986  Shimizu .............................. 358/256
4,752,929  6/1988  Kantz et al. ........................ 371/24 X Primary Examiner—Raulfe B. Zache
Attorney, Agent, or Firm—Finnegan, Henderson, Farabow, Garrett, and Dunner

[57] ABSTRACT

An information processing apparatus is provided with an optical disk for storing image data and code data. The code data stored in the optical disk have different data format. The optical disk further stores a flag indicating the data format of each code data. When retrieving the code data from optical disk, the processing apparatus processes the retrieved code data according to the data format indicated by the flag, and stores the processed data into a floppy disk.

19 Claims, 29 Drawing Sheets

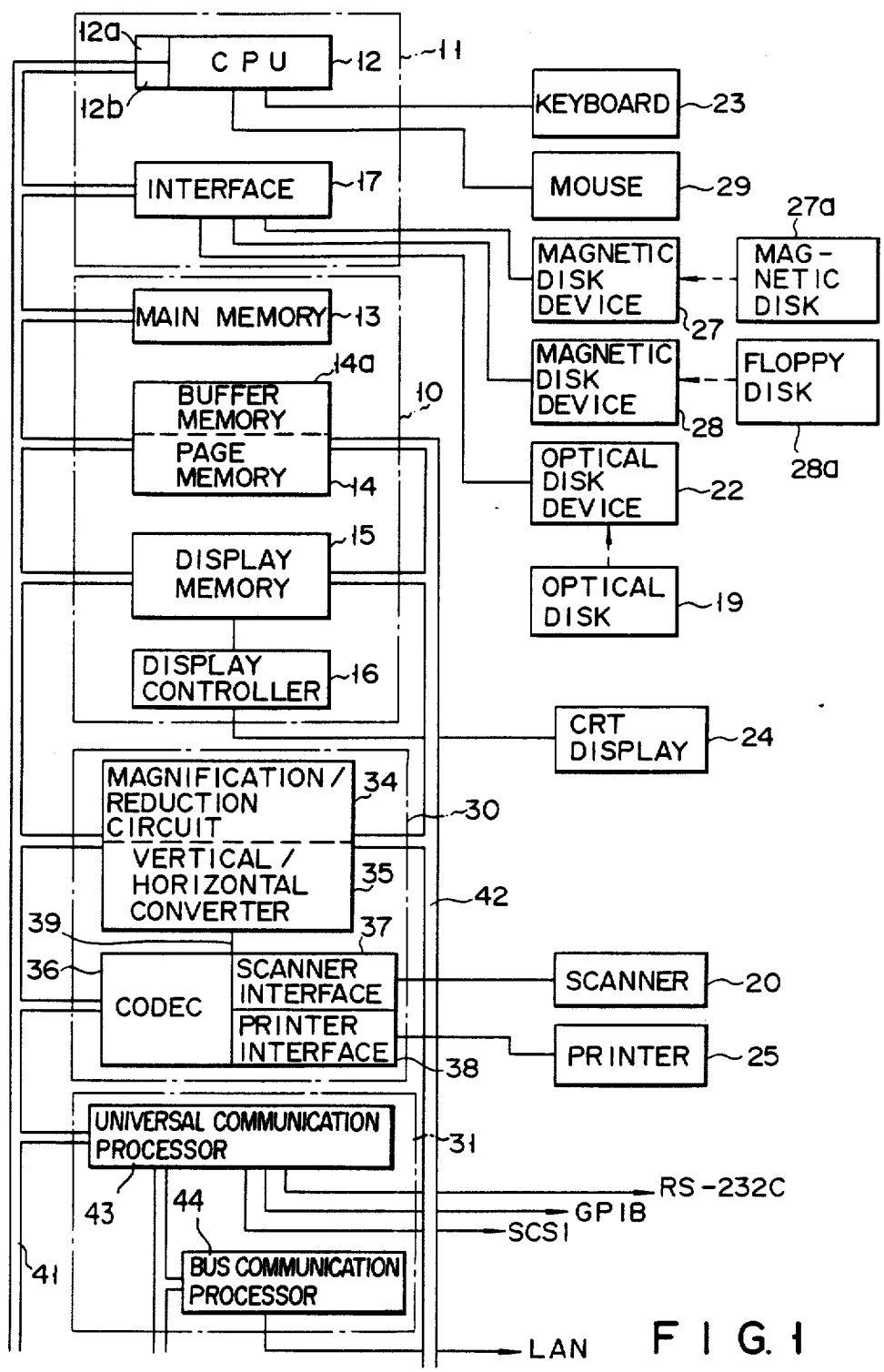
F I G. 1

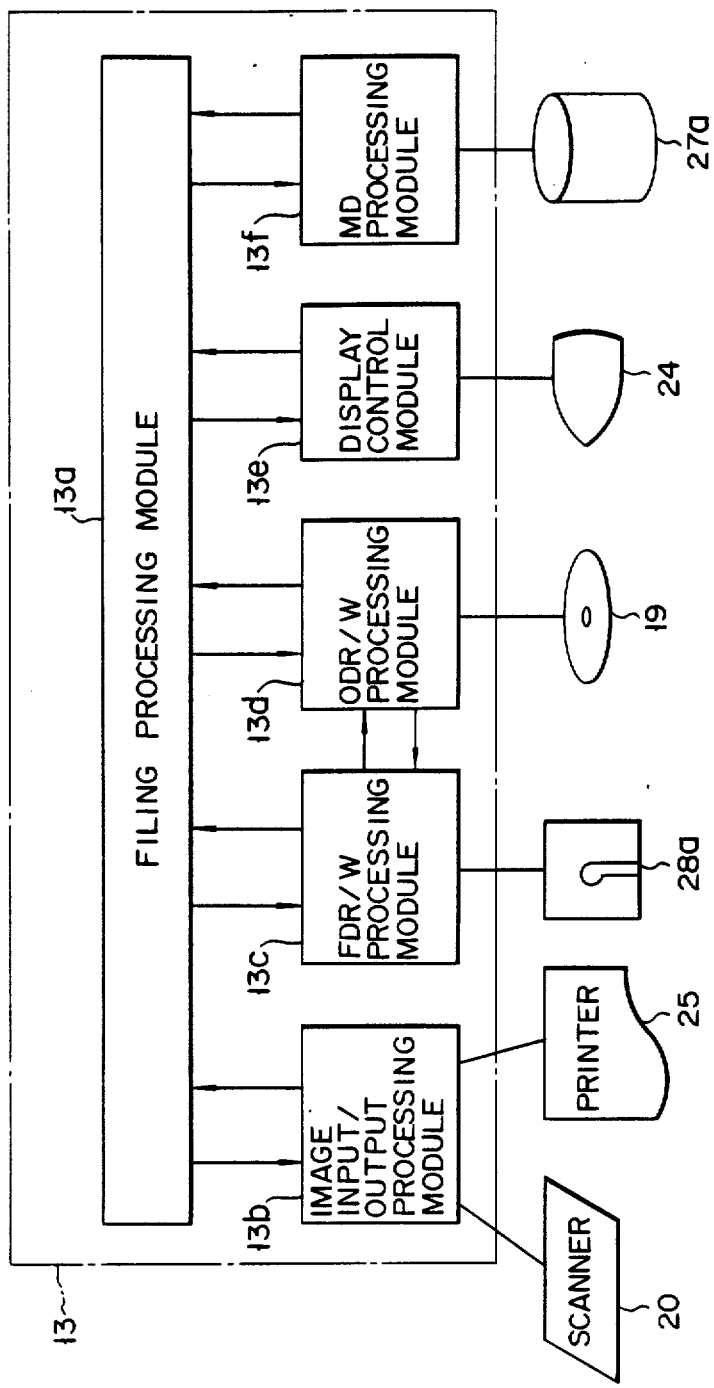
F I G. 3

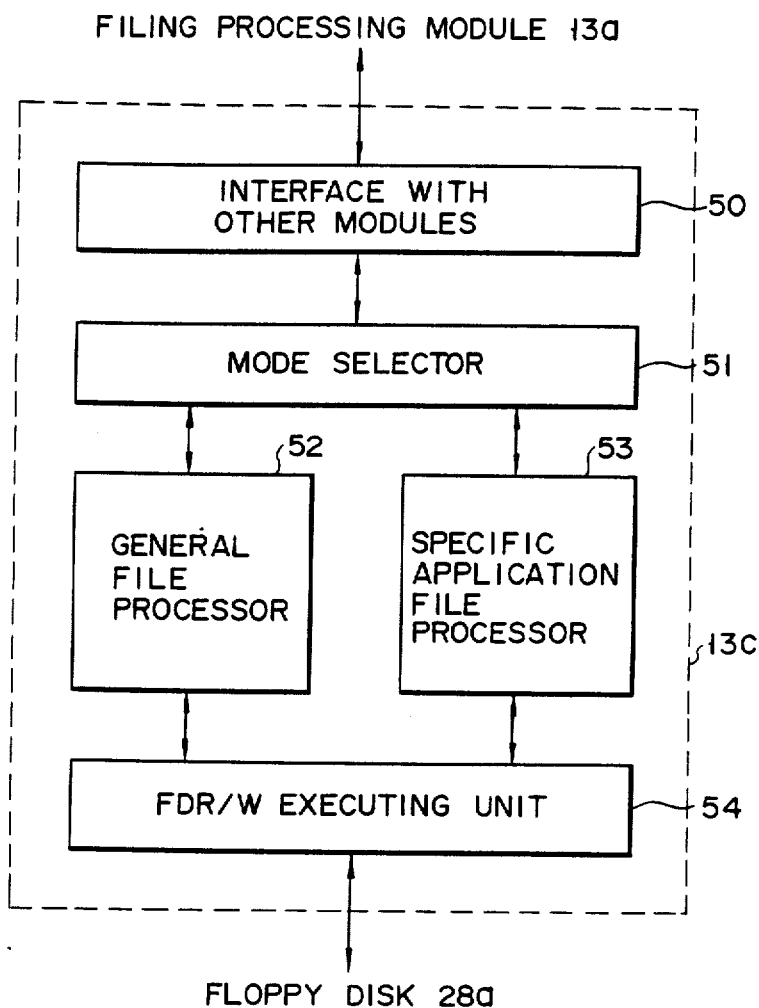
F I G. 4

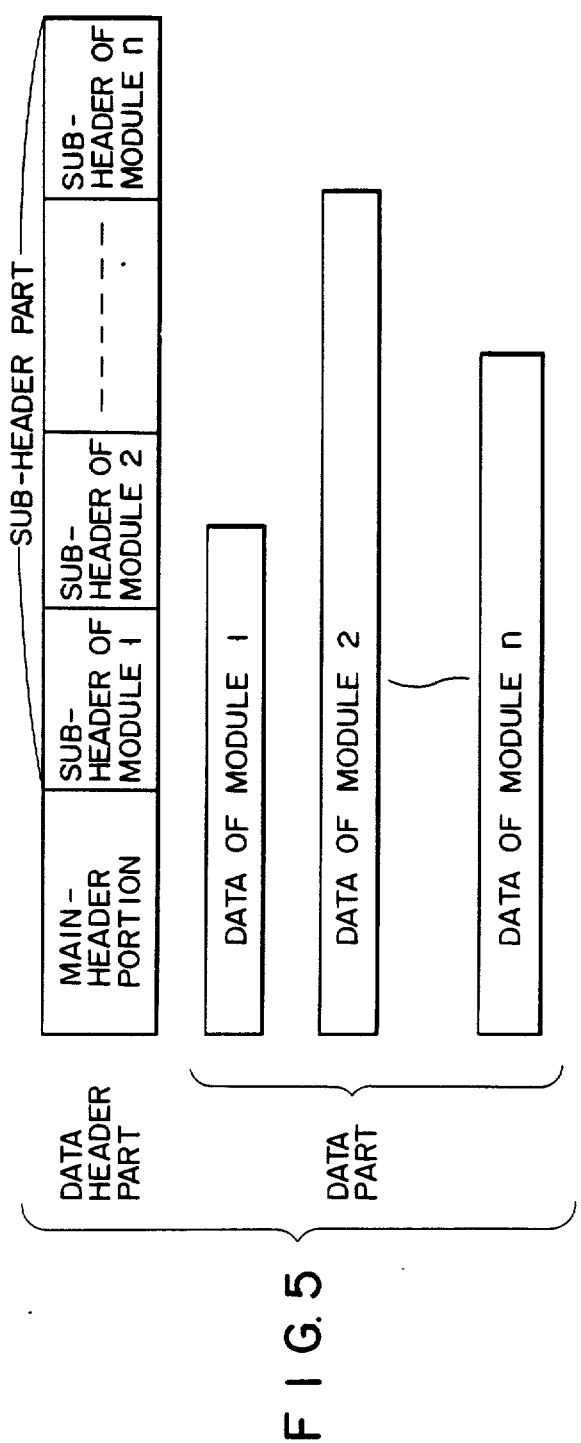

FIG. 7

| SUB-HEADER LENGTH (2 BYTES) | KIND FLAG (2 BYTES) | DATA ADDRESS (4 BYTES) | DATA SIZE (4 BYTES) | COMPRESSION FORM (2 BYTES) | SCANNING DENSITY (2 BYTES) | IMAGE SIZE (4 BYTES) | OPTION AREA (0~n BYTES) |
|---|---|---|---|---|---|---|---|

FIG. 8

| SUB-HEADER LENGTH (2 BYTES) | KIND FLAG (2 BYTES) | DATA ADDRESS (4 BYTES) | DATA SIZE (4 BYTES) | DEVICE FLAG (2 BYTES) | DENSITY FLAG (2 BYTES) | OS FLAG (2 BYTES) | VOLUME NAME (12 BYTES) | OPTION AREA (0~n BYTES) |
|---|---|---|---|---|---|---|---|---|

FIG. 9

| SUB-HEADER LENGTH (2 BYTES) | KIND FLAG (2 BYTES) | DATA ADDRESS (4 BYTES) | DATA SIZE (4 BYTES) | DEVICE FLAG (2 BYTES) | DENSITY FLAG (2 BYTES) | OS FLAG (2 BYTES) | VOLUME NAME (12 BYTES) | DIRECTORY ENTRY DATA (32 BYTES) | OPTION AREA (0~n BYTES) |
|---|---|---|---|---|---|---|---|---|---|

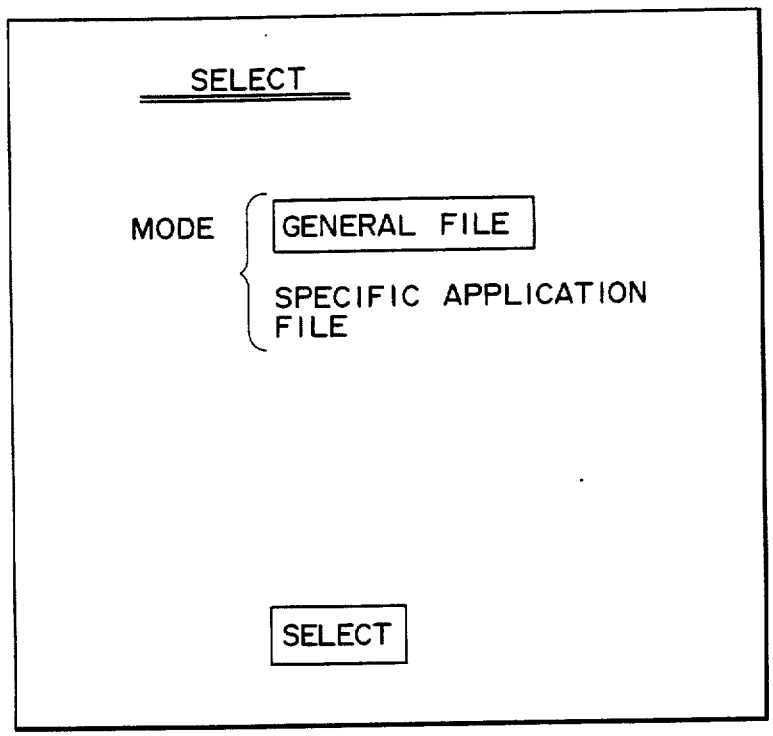
F I G. 13

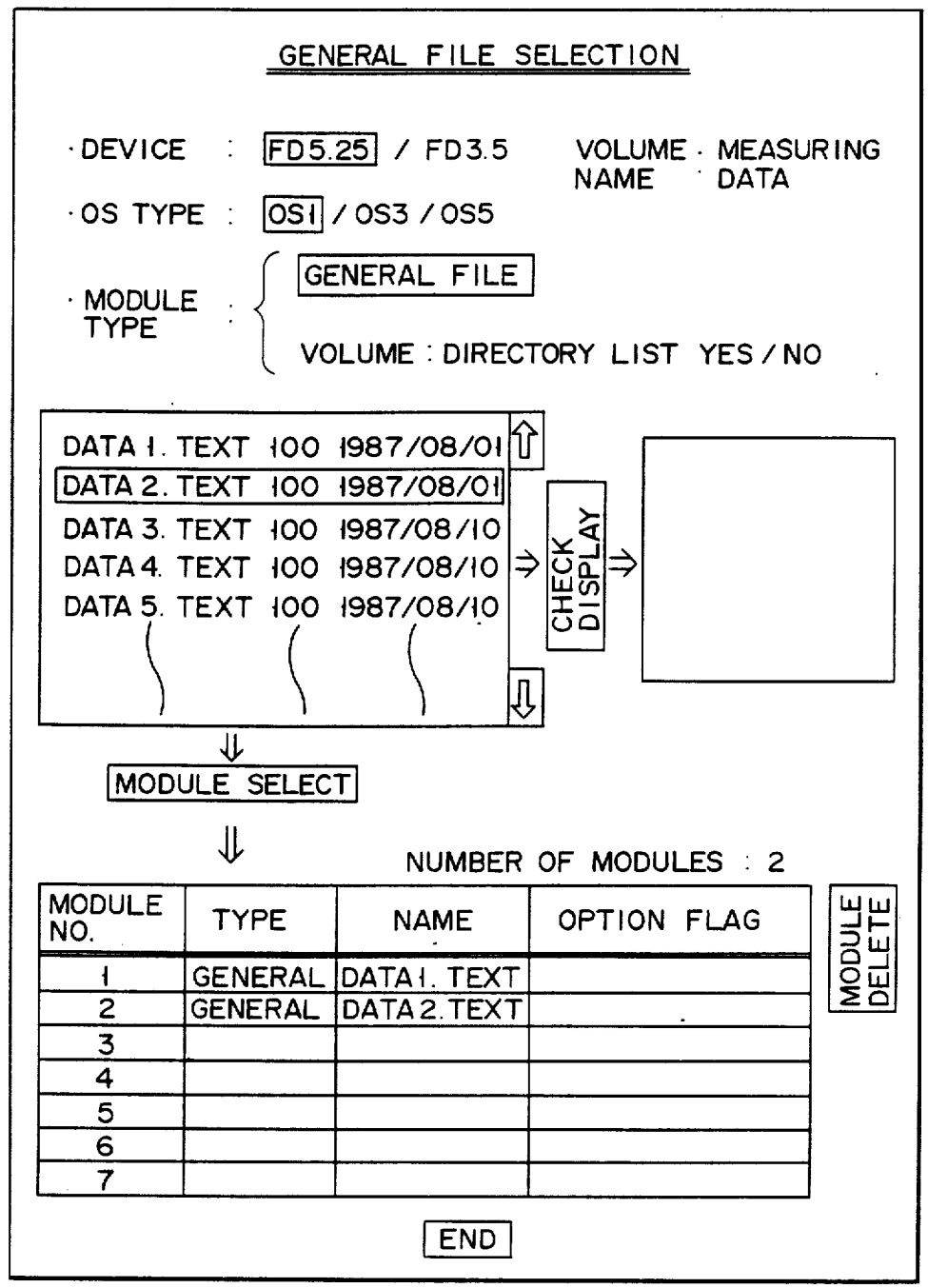
F I G. 14

GENERAL FILE SELECTION

- DEVICE : [FD 5.25] / FD 3.5      VOLUME NAME : SYSTEM DISK
- OS TYPE : [OS1] / OS3 / OS5

- MODULE TYPE : { GENERAL FILE
                  [VOLUME] : DIRECTORY LIST [YES] / NO

```
COMMAND.COM  12000  1987/01/10  ⇧
BASIC.COM     8000  1987/01/10
                                ⇩
```

[CHECK DISPLAY]

⇓

[MODULE SELECT]

⇓

NUMBER OF MODULES : 1

| MODULE NO. | TYPE | NAME | OPTION FLAG | MODULE DELETE |
|---|---|---|---|---|
| 1 | VOLUME | SYSTEM DISK | DIRECTORY LIST | |
| 2 | | | | |
| 3 | | | | |
| 4 | | | | |
| 5 | | | | |
| 6 | | | | |
| 7 | | | | |

[END]

F I G. 15

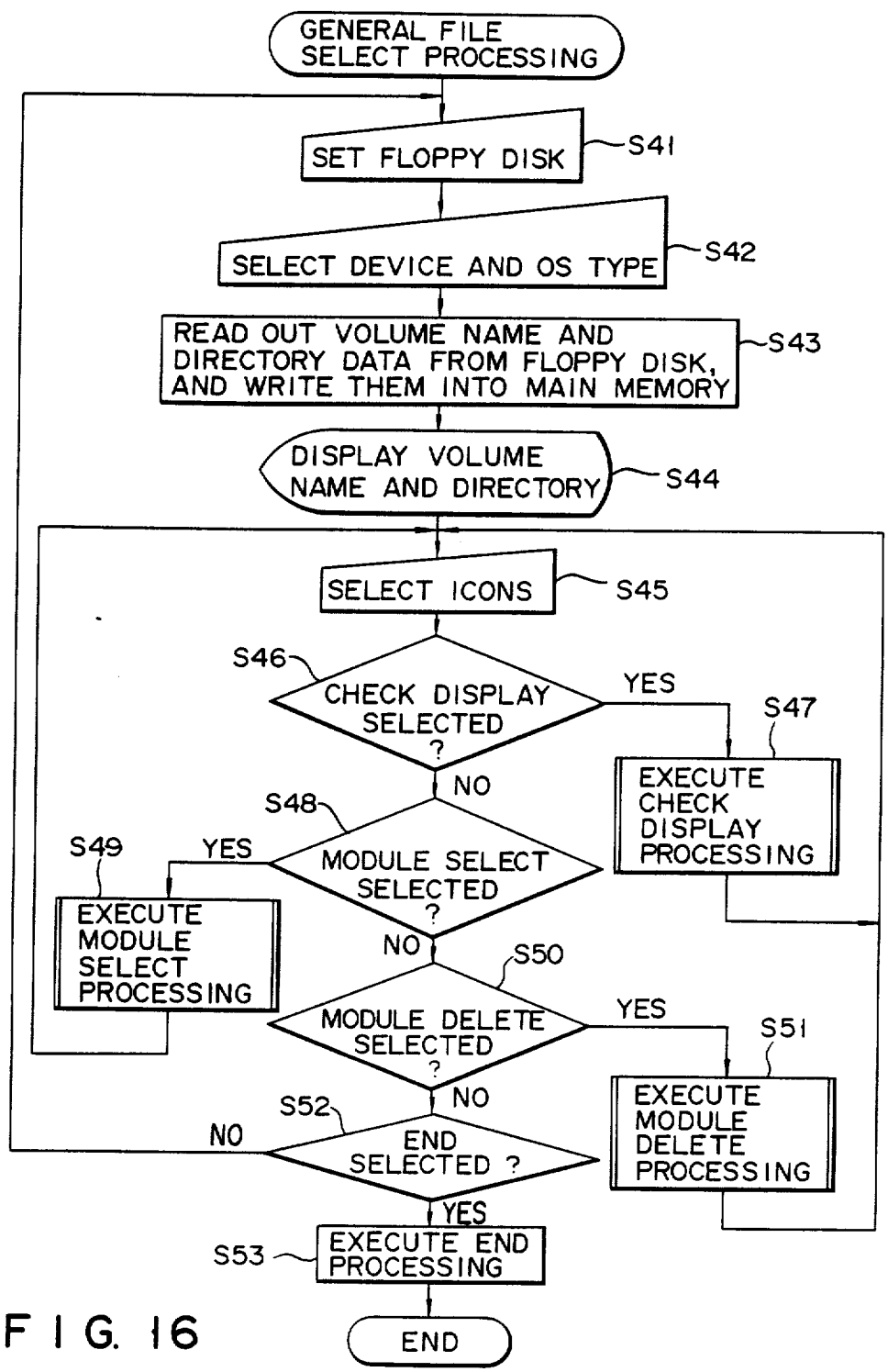
F I G. 16

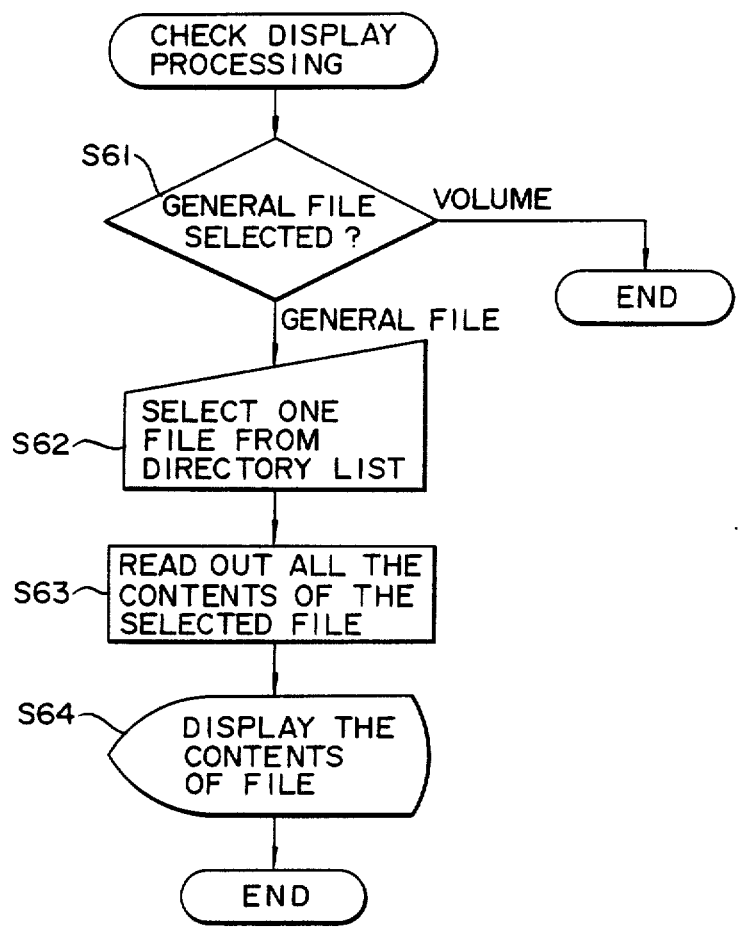
F I G. 17

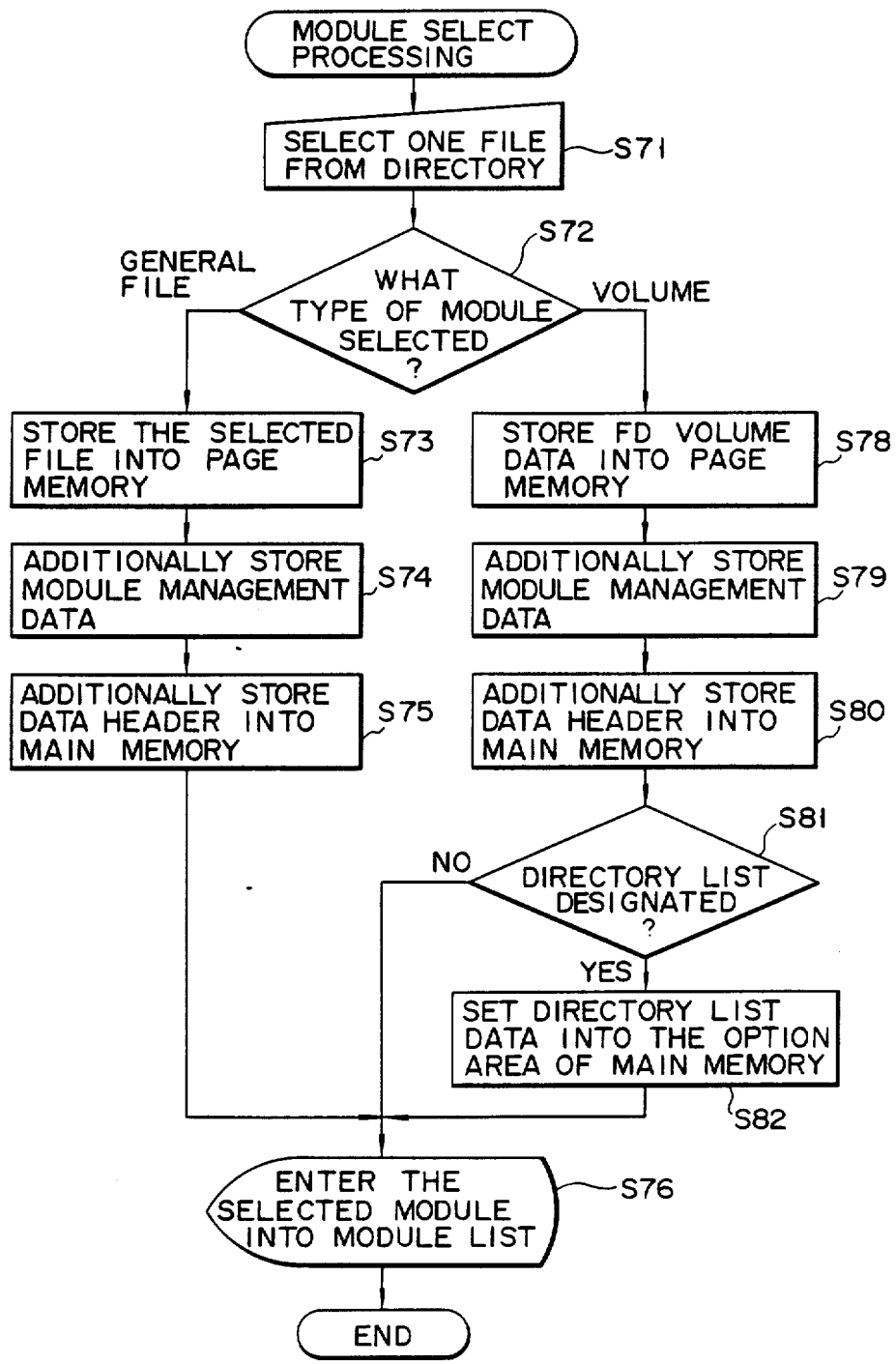
F I G. 18

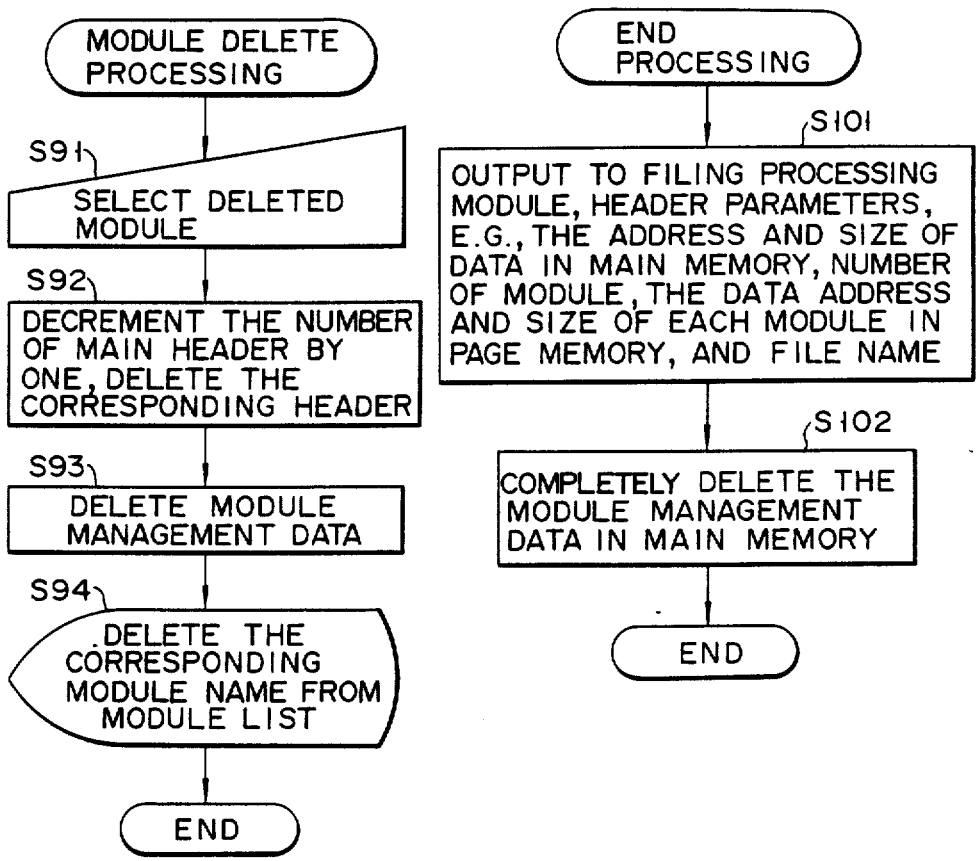
F I G. 19  F I G. 20

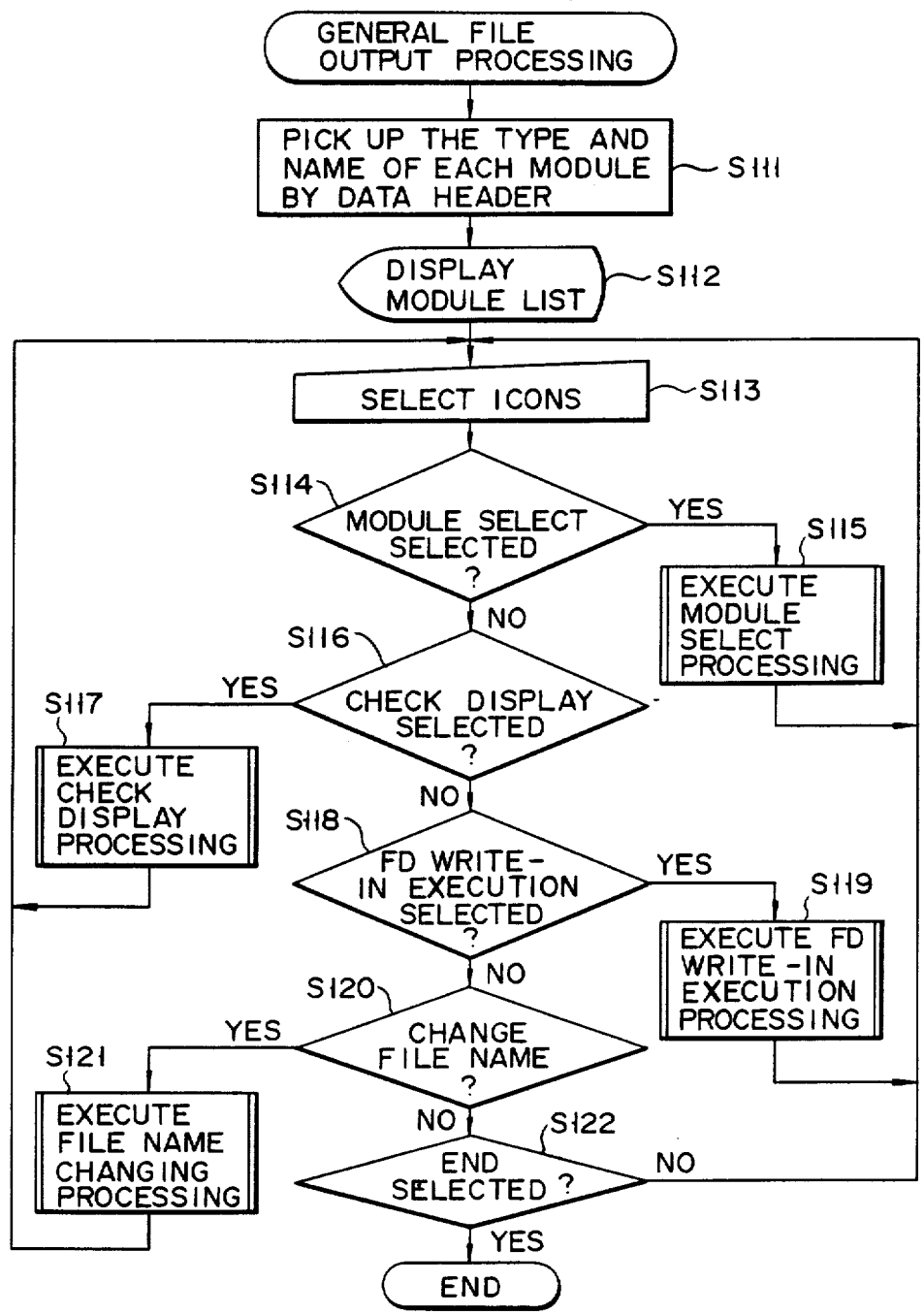
F I G. 21

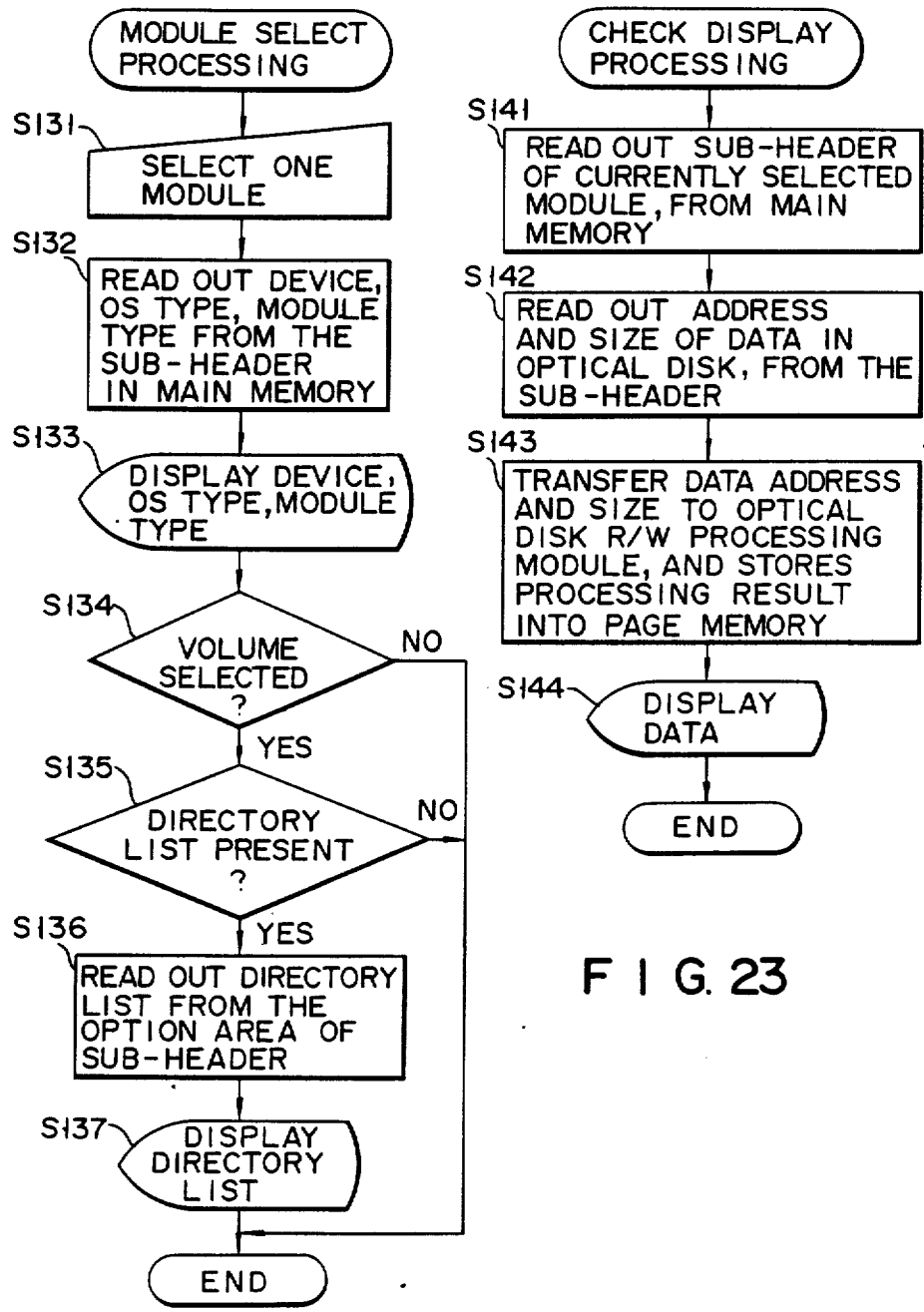
F I G. 23
F I G. 22

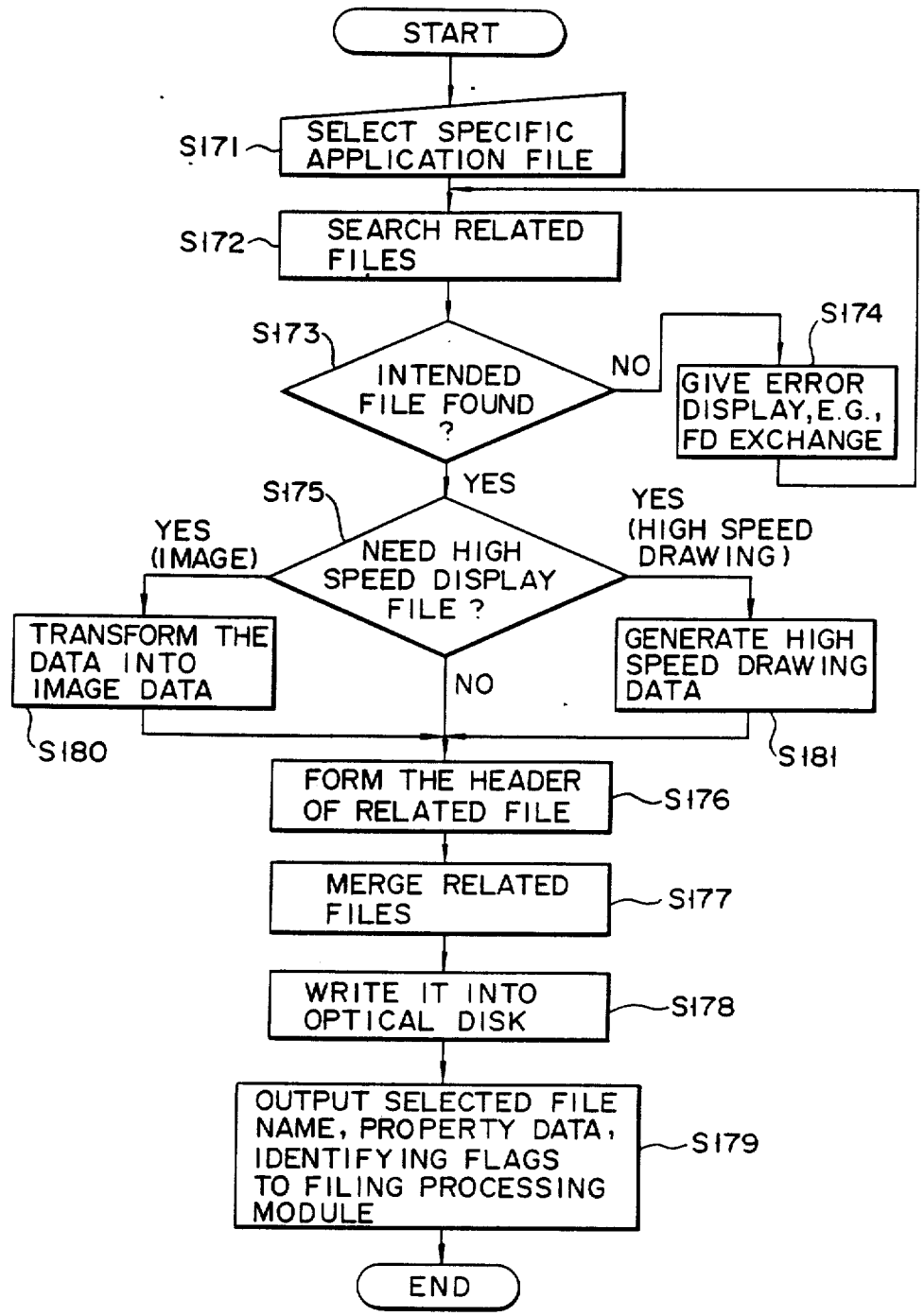
F I G. 27

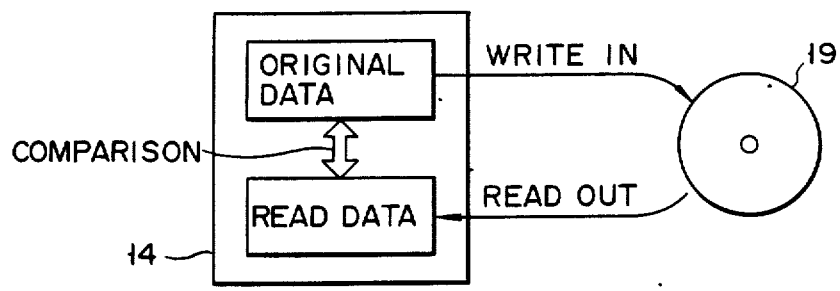
F I G. 31
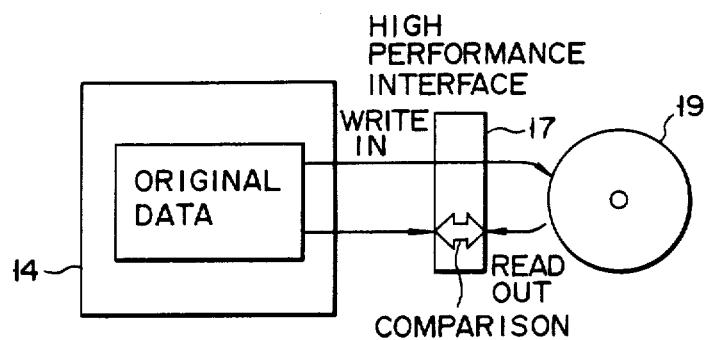
F I G. 32
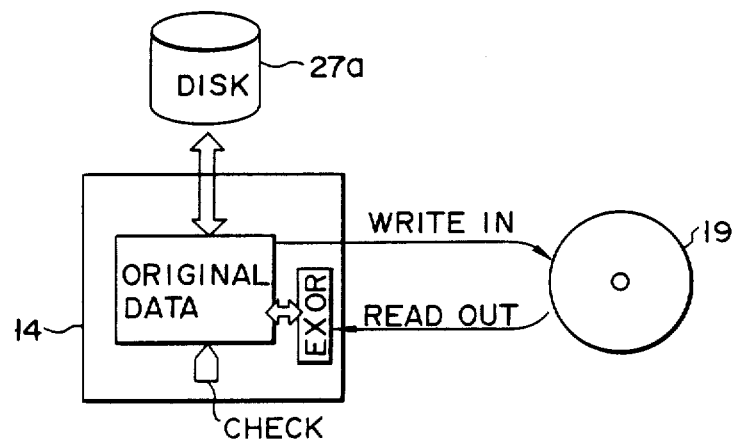
F I G. 33

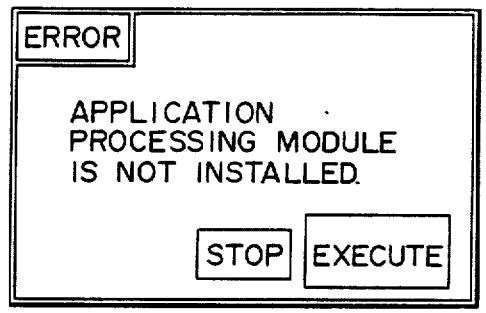
F I G. 35
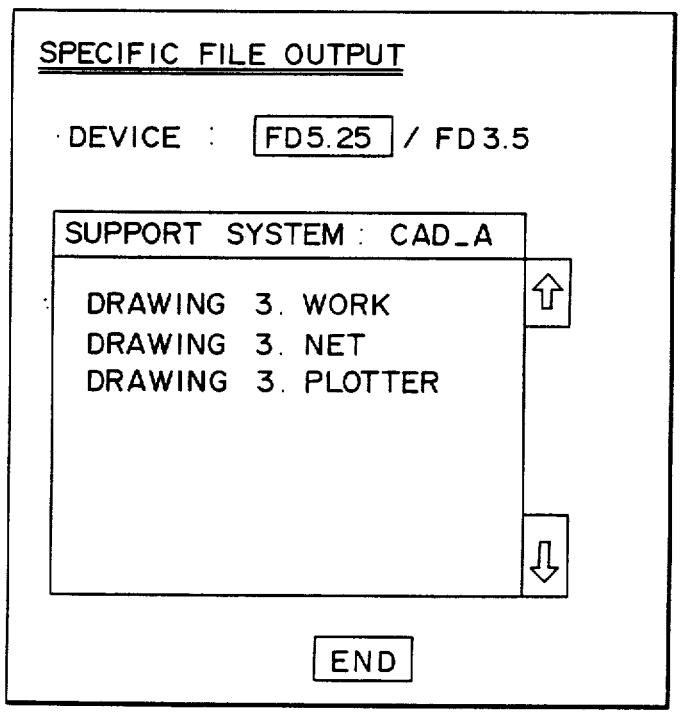
F I G. 36
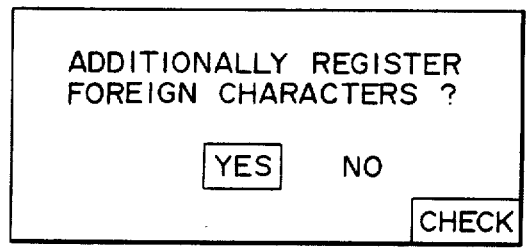
F I G. 37

APPARATUS FOR PROCESSING CODE DATA ASSOCIATED WITH MANAGEMENT DATA INCLUDING IDENTIFICATION DATA

BACKGROUND OF THE INVENTION

1. Field of the Invention

The present invention relates to an information processing apparatus for electronically filing documents in connection with a recording medium of large memory capacity.

2. Description of the Related Art

Recently, offices and manufacturing factories have been flooded with a tremendous number of documents containing literal and graphic information. Electronic engineers, particularly, are now under continuous pressure to develop effective filing and retrieval apparatus. Documents may come in three varieties: normal literal documents and drawings as manually written or drawn and printed in a conventional manner, documents having character code data, as processed by word processors, and drawings (having vector data) as prepared by personal computers and CAD (computer aided design) systems. The word processed data, and the graphic and pictorial data as generated with the aid of personal computers and CAD systems are magnetically stored on floppy disks. Generally, the hard copy of these types of information, together with the floppy disks, are filed for preservation and reference. The hard copy is space consuming.

U.S. Pat. No. 4,604,653 to Shimizu, issued on Aug. 5, 1986, discloses a document filing apparatus. The filing apparatus optically and two-dimensionally scans documents by a two-dimensional scanner, picks up the data on the documents, and stores the data as image data into an optical disk or disks. When certain data is needed later, the intended data is quickly retrieved from the optical disk.

The filing apparatus of Shimizu can handle only the image data as read in by the scanner. In other words, a document management system employed by the filing apparatus is unable to synthetically handle both the floppy disk (FD) stored data and the optical disk stored data, because of format difference thereof. To store the FD data into an optical disk, therefore, a user must take two additional bothersome steps. First, the user must print out the FD data into a hard copy, and second, the user must read in the hard copied data by the scanner. Such steps are time consuming and irritating and may ultimately dissuade the user from operating the filing apparatus.

Another existing information processing apparatus for document filing and is capable of reading out the data from a floppy disk and storing it into the optical disk. In the processing apparatus, however, the management system for the image data cannot handle the floppy disk stored data. Therefore, when the document data and the drawing data being stored in a floppy disk is read out therefrom and stored into an optical disk, it is a common practice to drive different systems. In most case, different apparatuses have been used for the storage of such type of data into the optical disk. These storage operations by different systems or apparatuses are bothersome and intricate, particularly for unskilled operators, and hence hinder a smooth operation of filing. Further, the necessity of using the different systems makes it impossible to synthetically manage and preserve those documents including drawings.

For the above background reasons, there is a need for information processing apparatus capable of synthetically handling and managing both types of data: the floppy disk stored data and the optical disk stored data.

SUMMARY OF THE INVENTION

Accordingly, it is an object of the present invention to provide an information processing apparatus in which the FD stored data of document and drawing are handled like the paper document and drawings, and both types of data are synthetically managed.

According to one aspect of this invention, there is provided an information processing apparatus for processing code data, comprising means for receiving a plurality of code data each having a data format inherent thereto, means for associating to each code data with management data including identification data representing the inherent data format, and means for storing the plurality of code data and the associated management data.

According to another aspect of this invention, there is provided an information processing apparatus for processing code data, comprising means for supplying a plurality of code data, each code data having a data format inherent thereto, means for storing the plurality of code data supplied from the supplying means, and means for checking whether or not the plurality of code data have correctly been stored, when the code data is stored into the storing means.

According to still another aspect of this invention, there is provided an information processing apparatus for processing code data, the apparatus comprising means for storing a plurality of code data each having a data format inherent thereto and identification data representing the inherent data format, means for retrieving the code data from the storing means, and means for checking the inherent data format of the code data retrieved by the retrieving means referring to the identification data of the code data retrieved by the retrieving means.

BRIEF DESCRIPTION OF THE DRAWINGS

FIG. 1 shows a block diagram of an information processing apparatus according to an embodiment of the present invention;

FIG. 3 shows a functional block diagram for explaining the structure of a control program or software used in the above embodiment;

FIG. 4 shows a functional block diagram showing a configuration of a FDR/W processing module of FIG. 3;

FIG. 5 shows a format of the data employed by the above software;

FIG. 6 shows a format of a main header;

FIG. 7 shows a format of an image header;

FIG. 8 shows a format of a volume data header;

FIG. 9 shows a format of a file data header;

FIGS. 13 to 15 show displays used for FD read-in processing;

FIGS. 16 to 20 show flow charts useful in explaining a flow in FD read-in processing;

FIGS. 21 to 24 show flow charts useful in explaining a flow in FD write-in processing;

FIG. 27 shows a flow chart for explaining a flow in the registration of specific application files;

FIGS. 31 to 33 show schematic diagrams for explaining comparative verification functions for code data check;

FIG. 35 shows a display containing an error message;

FIG. 36 shows a display used for the specific application file output processing;

FIG. 37 shows a display for foreign character registration;

DETAILED DESCRIPTION OF THE PREFERRED EMBODIMENTS

Figure 2:
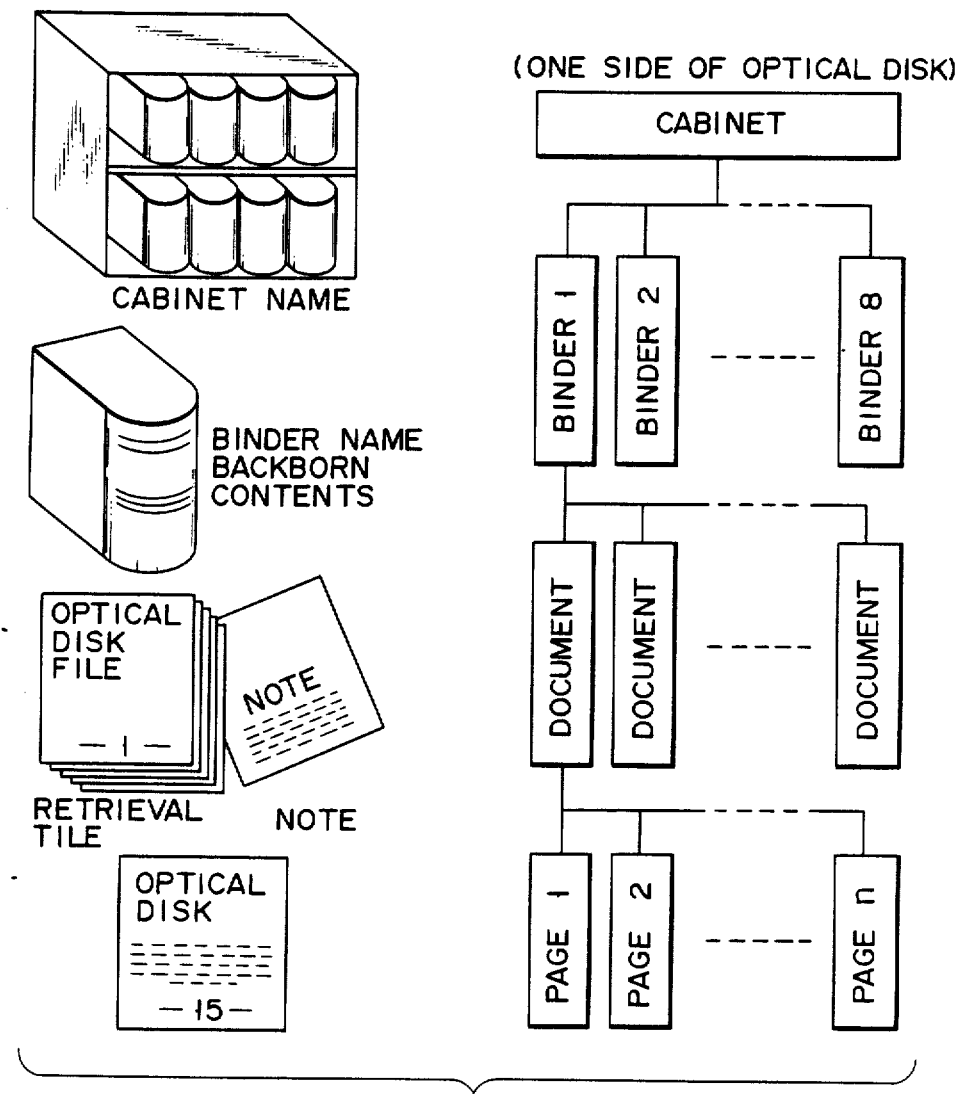
FIG. 2 shows a view for schematically explaining a document management system employed in the above embodiment.

A hardware configuration of an information processing apparatus according to an embodiment of this invention will be described referring to FIG. 1. As is shown, the processing apparatus includes a control module 11, a memory module 10, an image processing module 30, a communication control module 31, a scanner 20, an optical disk device 22, a keyboard 23, a CRT display device 24, a printer 25, a magnetic disk device 27, another magnetic disk device 28, a mouse 29, a system bus 41, and an image bus 42.

The control module 11 is made up of a CPU (central processing unit) 12 for executing various controls of the filing apparatus, and an interface circuit 17 allowing a bidirectional communication between this CPU 12 and external devices, such as optical disk device 22, and magnetic disk devices 27 and 28. CPU 12 is coupled with keyboard 23 and mouse 29.

The memory module 10 is made up of a main memory 13, a page memory 14, a display memory 15, and a display controller 16. The display memory 15 and display controller 16 serve as a display interface. The page memory 14, has a memory capacity capable of storing image data amounting to several pages of A4-size documents. Page memory 14 is partially occupied by a buffer memory area 14a. Data read/write for buffer memory area 14a is controlled by a counter (not shown).

The image processing module 30 is made up of a magnification/reduction circuit 34, a vertical/horizontal converter 35, a compressor/expander (CODEC) 36, a scanner interface 37 for scanner 20, a printer interface 38 for printer 25, and an internal bus 39. Magnification/reduction circuit 34 is for magnifying and reducing the size of a picture based on image data. Vertical/horizontal converter 35 is for rotating the picture by image data through a coordinate transformation. CODEC 36 is for compressing image data for redundancy/reduction and expanding for restoring the compressed signal into the original signal. Internal bus 39 interconnects a group of magnification/reduction circuit 34 and vertical/ horizontal converter 35 with another group of CODEC 36, scanner interface 37, and printer interface 38.

Communication control module 31 is made up of a UCP (universal communication processor) 43 and a BCP (bus communication processor) 44. UCP 43 is connected to external devices such as an FCP (facsimile communication processor) and personal computers, by way of an interface means such as RS-232C, GPIB and SCSI. BCP 44 is coupled with a LAN (local area network).

CPU 12 is provided with a vector/raster converter 12a and a code/image converter 12b. Vector/raster converter 12a converts vector data as drawing data as derived from floppy disk 28a to be described later, into raster data as image data. Code/image converter 12b converts code data as document data as read out of floppy disk 28a, into image data. The vector-to-raster and code-to-image data conversions may be executed in a software manner, if necessary.

System bus 41 as a path for control signals interconnects control module 11, memory module 10, image processing module 30, and communication control module 31. Image bus 42 as a path for image data interconnects memory module 10 and image processing module 30.

Display memory 15 stores the image data as actually displayed in the windows of CRT display 24, viz., the image data as obtained after the image data of page memory 14 is subjected various types of processing, such as magnification, reduction, rotation, insertion, and inversion.

Scanner 20, which is, for example, a two-dimensional scanner, two dimensionally scans a document by a laser beam, collects the image data on the document, and outputs them in terms of electrical signal.

Magnetic disk device 28 is a floppy disk device using floppy disk 28a, which may be a 5.25 inch floppy disk. The disk device reads out from floppy disk 28a the text files (document data) prepared by word processors (not shown), and the code data files such as CAD drawing files and work sheet files (drawing data) as prepared by personal computers. Floppy disks 28a prepared on the basis of many OSs (operating systems) are adaptably available.

Optical disk device 22 sequentially stores into optical disk 19 the image data as read out by scanner 20 and the code data as read out by magnetic disk device 28.

Keyboard 23 enters the retrieval codes respectively assigned to the code data and the image data to be stored into optical disk 19, and various commands for operations.

CRT display device 24 as one of the output devices uses a cathode ray tube as a visual presenting means. The display device displays the image data from scanner 20, the code data read out by magnetic disk device 28, and the code data and image data as read out by optical disk device 22. Further, the display device 24 is capable of displaying the entire documents by means of a maximum of four display windows. For example, four documents can concurrently be displayed in a vertical array. Various editing works, such as magnification, reduction, rotation, and scrolling may be conducted in each window independently of other windows.

Printer 25 prints out in the form of hard copy, various data, such the image data from scanner 20, the code data read out by magnetic disk device 28, the code data and image data as read out by optical disk device 22, and the image data being displayed by display device 24.

Magnetic disk device 27 is a hard disk device with a magnetic disk 27a. Magnetic disk 27a stores various types of control programs, retrieval codes entered from keyboard 23, and retrieval data (management data) corresponding to each retrieval code. The retrieval data includes memory addresses and data size of the code data and/or the image data representing one document which are stored in optical disk 19 with the retrieval codes assigned, and a flag to indicate the type of data, code data and image data. The one document code data and/or image data is stored into a retrieval data area of optical disk 19. The addresses used are logical addresses, and therefore when accessed, the physical track address and physical sector address in the optical disk is calculated for each address.

Mouse 29 is a pointing device. The device is used to selectively point out a desired item to be edited (edition item) on the screen by moving a cursor on the screen vertically and/or horizontally. The edition items are displayed in a fixed location on the display screen, and include various modes, edited image, range of cutting and merging of images, icon, and the like.

How the image data and the code data are synthetically managed will be described with reference to FIG. 2, from the viewpoint of the document management system.

A document management system in this instance, illustrated in FIG. 2, includes data hierarchy has four strata: cabinet, binder, document, and page. The cabinet is made to correspond to one side of optical disk 19. The cabinet may be defined by a maximum of eight binders. Each binder may contain a maximum of 30,000 documents. A title is assigned to each document. The structure of the titles is defined for each binder. One document is treated as a fundamental unit of a file. "Note" as an explanation for a document may be added to the document, in addition to the title. The document includes a maximum of 4095 pages.

The above document management system is structured to be similar to a paper filing system. The page corresponds to one paper file. The document management system manages the code data at the page level. Specifically, the page corresponds to the image data of one sheet of paper, the data of one sheet of floppy disk (volume data), the data of one file, or the data by merging the above three types of data. The document management system can manage the code data and image data, which must be separately managed by the conventional filing apparatus. For example, within one document, a source file group (code data) of a given program is assigned to a first page, a program specification (code data) prepared by a word processor, to a second page, and the results of processing (image data) to a third page.

A control program stored in main memory 13, viz., the structure of software used in the filing apparatus, will be described with reference to FIG. 3.

The software is made up of six modules: image input/output processing module 13b, floppy disk read/write (FDR/W) processing module 13c, optical disk read/write (ODR/W) processing module 13d, display control module 13e, magnetic disk (MD) processing module 13f, and filing processing module 13a for controlling all the above modules.

A control flow in filing processing module 13a in a registration mode will be described.

First, an operator checks whether the data to be registered is the image data or the data from floppy disk, and enters the check result for filing processing module 13a. After entering the title, when the data to be registered is the image data, image input/output processing module 13b is called, so that the image data is transferred from scanner 20 to the module 13b. Then, display control module 13e is called. Display control module 13c checks the image data on CRT display 24. Following this, ODR/W processing module 13d is called, and the input image data is compressed, and recorded into optical disk 19. After calling MD processing module 13f, the address in optical disk 19, together with the input title data, is registered into magnetic disk 27a.

To register the data into a floppy disk, FDR/W processing module 13c is called. The designation and processing of the registered data, i.e., volume data, general files, or specific application files, are executed within FDR/W processing module 13c. Therefore, filing processing module 13a may be indifferent to these operations.

Within FDR/W processing module 13c, necessary data is read out from floppy disk 28a in response to a command entered by an operator, and is set up in a predetermined format in page memory 14. Filing processing module 13a calls the top address of the data and data length, and ODR/W processing module 13d, and records the data set up in page memory 14, into optical disk 19. When the data read out from floppy disk 28a cannot be stored at one time into page memory 14, filing processing module 13a repeats to call FDR/W processing module 13c and ODR/W processing module 13d. Upon completion of the registration, filing processing module 13a calls MD processing module 13f, and records the address in optical disk 19, together with the input title data, into magnetic disk 28a, as in the mode of registering the image data.

A control flow of filing processing module 13a in a retrieval mode will be described.

An operator enters a retrieval formula containing a retrieval key and a key word for retrieval. The retrieval processing is executed by MD processing module 13f. The result of the retrieval is displayed by CRT display device 24. Upon designation of a document to be retrieval by the operator, filing processing module 13a outputs a retrieval request command to ODR/W processing module 13d. ODR/W processing module 13d checks the kind flag referring to a data header part to be described later. When the flag indicates image data, the module 13a applies the compressing processing to the data, and loads it into page memory 14. When the retrieved data is code data, the data is intactly loaded into page memory 14.

When the operator requests the display of the retrieved result, the module 13a checks whether display of the retrieved data is possible or not, referring to the kind flag. If the display is possible, the module 13a calls display control module 13e. Under control of the called display control module 13e, CRT display device 24 displays that data. If the display is impossible, an error message is output.

The called display control module 13e executes the processing for the retrieved data, image data, or the code data, and causes CRT display device 24 to display the retrieved data on the display screen. When an operator requests the storage of the retrieved data into floppy disk 28a, FDR/W processing module 13c is called, and writes the retrieved data into the floppy disk. In this case, the entry of the file name in connection with the data writing is executed by FDR/W processing module 13c. Therefore, filing processing module 13a may be indifferent to the file name entry.

FDR/W processing module 13c is configured as is shown in FIG. 4. This module 13c is made up of interface 50 for other modules, mode selector 51 for selecting either of the general file or the specific application file, general file processor 52, specific application file processor 53, and FDR/W executing unit 54.

FDR/W processing module 13c is called from filing processing module 13a. FDR/W processing module 13c executes the processing for reading out the code data from floppy disk 28a and writing it into page memory 14, and the processing for reading out the code data from paper memory 14 and writing it into floppy disk 28a. For the former operation, FDR/W processing module 13c is called by filing processing module 13a in a registration mode. For the later operation, FDR/W processing module 13c is called by the same in a retrieval mode. The above processings include the operations to attach the data header part to the data, and to interpret the same.

The formats of the code data and image data to be stored in optical disk 19 will be described with reference to FIGS. 5 through 9.

In this instance, the format of optical disk 19 will be described in connection with floppy disk 28a of 5.25 inches and a specific OS file. If necessary, however, the format is adaptable for other types of floppy disks of 8 inches and 3.5 inches, a magnetic disk or a magnetic tape, and other OS files.

As is shown in FIG. 5, the data of one page for optical disk 19 includes a data header part and a data part. The data part stores the data of modules 1 to n. If the data of one page contains a work sheet data file, a drawing data file (net file), and an image expanded picture (plotter file), the number of modules in this data is "3." The data header part is made up of a main header portion and a sub-header part representing a format of data.

The main header portion, as is shown in FIG. 6, further includes total data length (4 bytes), total header length (2 bytes), registration date (4 bytes), number of constituent modules (2 bytes), specific application flag (2 bytes), and preparatory area (2 bytes), and has the length of a total of 16 bytes. The specific application comes in two varieties: a document management application and a drawing data management application. The document management application is for filing the document data prepared by a word processor. The drawing data management application is for filing the drawing data (CAD) by a personal computer. The application flag of the main header portion is used for indicating the document management application or the drawing data management application.

As for drawing data, a plurality of files are generated for each drawing. In this instance, these files are a work sheet file, a net file, and a plotter file. The work sheet file is generated by an operator when he prepares the CAD. The net file describes relative positions and connections of parts in the drawing. The plotter file (vector file) describes the above matters of parts in the format to operate printers and plotters. Under the drawing management application, these related files are systematically combined into one page, and are stored into the optical disk for their management. The drawing data thus managed may provide effective and smooth filing and retrieval operations. Thus, the design drawings, together with the information of the used parts, are filed and managed. In later use, users may retrieve the drawings and their related information of parts simultaneously.

As also for the document data, a plurality of files, such as a document file and a foreign character file in which foreign characters are registered for each document. Under the document management application, these related files are systematically combined into one page, and are stored into the optical disk for their management. The document data thus managed may provide effective and smooth filing and retrieval operations.

The sub-header part, as is shown in FIG. 5, is made up of several sub-headers whose number is determined by the number of constituent modules in the main header portion. The sub-header comes into three varieties, image data header, volume data header, and file data header. The image data header, as is shown in FIG. 7, includes sub-header length (2 bytes), kind flag (2 bytes), data address (4 bytes), data size (4 bytes), compression form (2 bytes: MH; MR; etc.), scanning density (2 bytes: 200 dpi; 300 dpi; etc.), image size (4 bytes: A4; B4; A3; etc.), and option area (0 to n bytes). The volume data header, as is shown in FIG. 8, includes sub-header length (2 bytes), kind flag (2 bytes), data address (4 bytes), data size (4 bytes), device flag (2 bytes), density flag (2 bytes), OS flag (2 bytes), volume name (12 bytes), and option area (0 to n bytes). The file data header, as is shown in FIG. 9, includes sub-header length (2 bytes), kind flag (2 bytes), data address (4 bytes), data size (4 bytes), device flag (2 bytes), density flag (2 bytes), OS flag (2 bytes), volume name (12 bytes), directly entry data (32 bytes), and option area (0 to n bytes).

The kind flag is used for indicating image data, volume data (data stored in the whole FD), or OS file data. The most significant bit of the kind flag indicates if the data can be expanded into the image data, that is, if it is an image expandable flag. More specifically, for the image data and document data, this flag is set. For the object code data, such as a execution file of a software program, it is not set. The data address indicates the address of the data in the optical disk. The data size indicates the size of the stored data.

The device flag indicates the type of floppy disk 28a used from which the current data is derived. In this instance, as recalled, three types of floppy disks of 5.25, 3.5, and 8 inches are available. The density flag indicates a recording density of the used floppy disk, 2DD or 2HD. When a magnetic tape is used, this flag indicates its recording density, 1600 bpi or 6250 bpi. The OS flag indicates the type of the OS used.

The option area of the volume data header may be used to record, for example, the directory table data in the volume data, i.e., all the data stored in a sheet of FD. The directory entry data area of the file data header stores, for example, a copy of the 32-byte data as stored in the current floppy disk 28a according to the used OS. The 32-byte includes file name, file size, date, etc. The format of the data differs, depending on the OS used.

Figure 10:
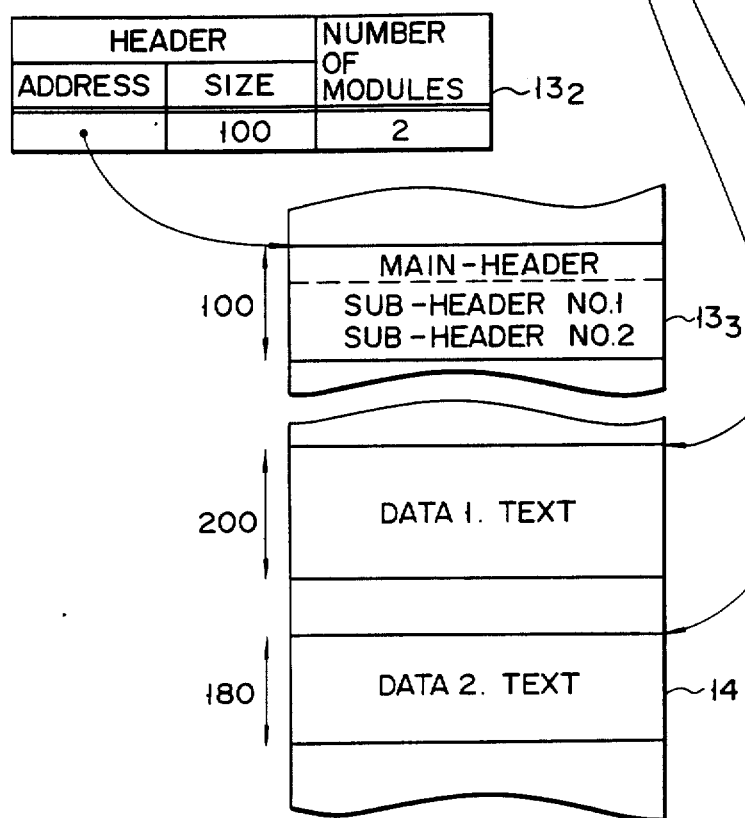
FIG. 10 shows a memory map of a main memory including module management data area, header management data area, and data header part area.

Main memory 13, as is shown in FIG. 10, generally includes three memory areas, module management data area $13_1$, header management data area $13_2$, and data header part area 13₃. Module management data area 13₁ stores module numbers, the classifications of files, file names, and the addresses and sizes of the data stored in page memory 14, which are tabulated with those items correspondingly arranged for each module, as is shown in FIG. 10. Header management data area 13₂ stores the number of modules currently selected and the address and size of the data of the header part as stored in main memory 13 (exactly stored in data header part area 13₃). Those items are arranged in a table, as is shown.

Figure 11:
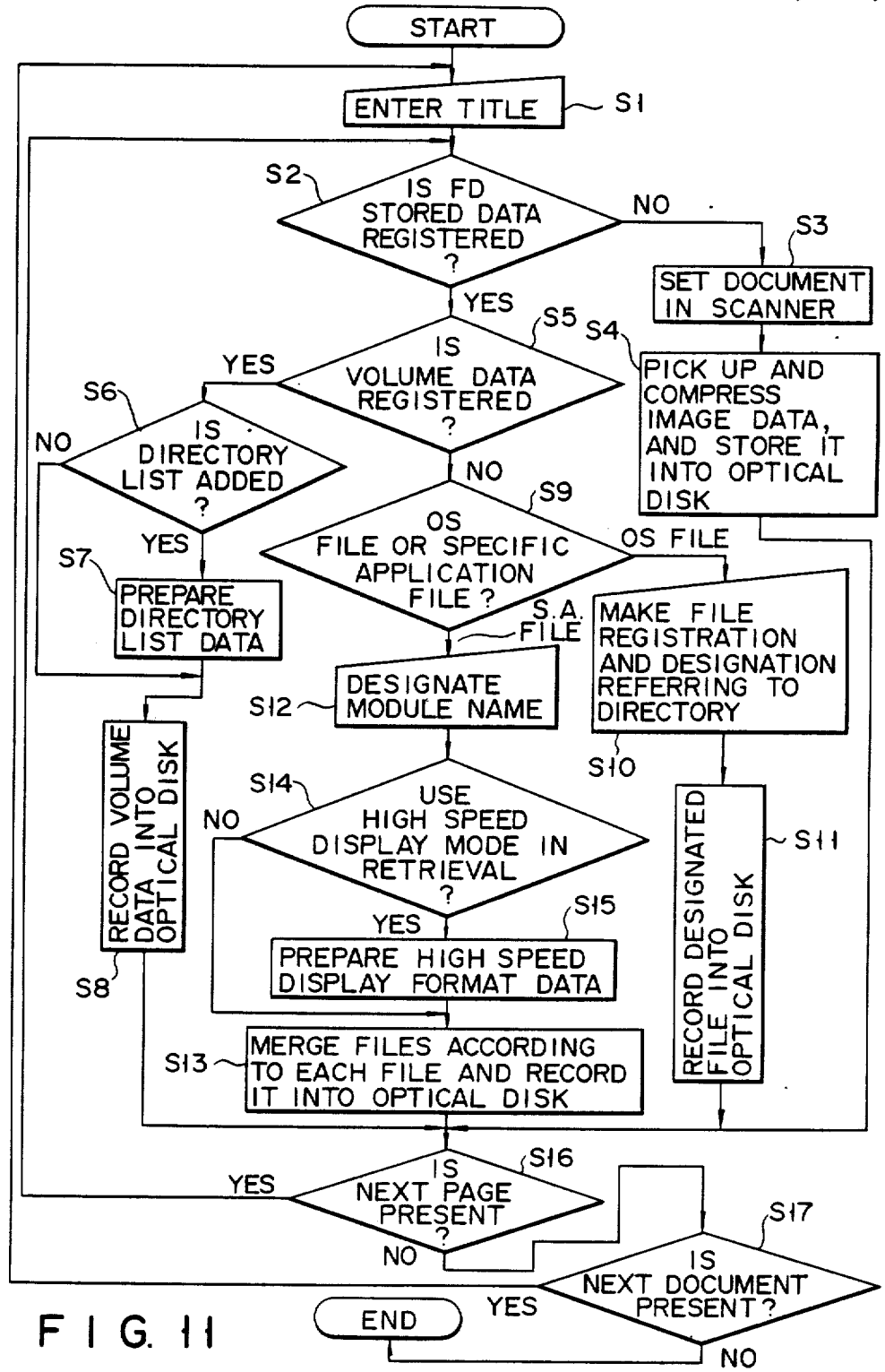
FIG. 11 shows a flow chart useful in explaining an overall flow in the data registration processing.

A registration processing of the information processing apparatus according to this invention will be described referring to FIG. 11. As recalled, in the document management system described in connection with FIG. 2, a plurality of pages are combined into a document. A title, or retrieval code, is attached to each document. According to the document management system, a title is first entered (step S1). An operator enters, by a related key, a command indicating the type of the data to be registered, the code data from floppy disk 28a or the image data as read in by scanner 20. If it is for the image data (step S2), a document is set on scanner 20 (step S3), and is scanned by scanner 20 (step S4). In this step, the image information on the document is optically collected and the collected data is properly compressed, and finally stored into the optical disk.

If the entered command is for the code data (step S2), floppy disk 28a is set in floppy disk device (FDD) 28. The operator then enters a command indicating the type of the data, i.e., volume registration, normal OS file registration, or specific application file registration, i.e., work sheet registration or CAD or drawing data registration. If the entered command represents the volume registration (step S5), it determined whether the directory list data is attached to the data header part (step S6). If the answer in step S6 is YES, the directory list data is set in the option area in the sub-header (step S7). Then, the volume data is stored into optical disk 19 (step S8).

In the case of the normal OS file registration (step S9), a directory list in floppy disk 28a is displayed and a file to be registered is designated or selected (step S10). In this case, a plurality of files may be selected simultaneously. After the data header part is prepared, the designated files are sequentially stored into optical disk 19 (step S11).

To register the specific application file (step S9), the module name is designated (step S12), so that a set of files having a file name formed under a given rule is automatically searched. After the data header part is prepared, the file set is stored into optical disk 19 (step S13). When it is retrieved later, one may desire to display the retrieved data at a high speed. To meet the requirement, step S14 is provided to designate the high speed display of the retrieved data. If the high speed display is designated (step S14), the data is formatted into a data format for the high speed display (step S15). The formatted data is attached to the data to be registered. This will be described later.

If it is necessary to check the recorded data in optical disk 19, such a meaning is entered to the filing apparatus. After the data recording to optical disk 19 is completed, the information processing apparatus automatically checks the recorded data, and if error is found, records the correct data again.

When the next page must be recorded (step S16), the above sequence of steps is repeated, starting with step S2. To record the next document (step S17), the repeated sequence starts with step S1.

Figure 12:
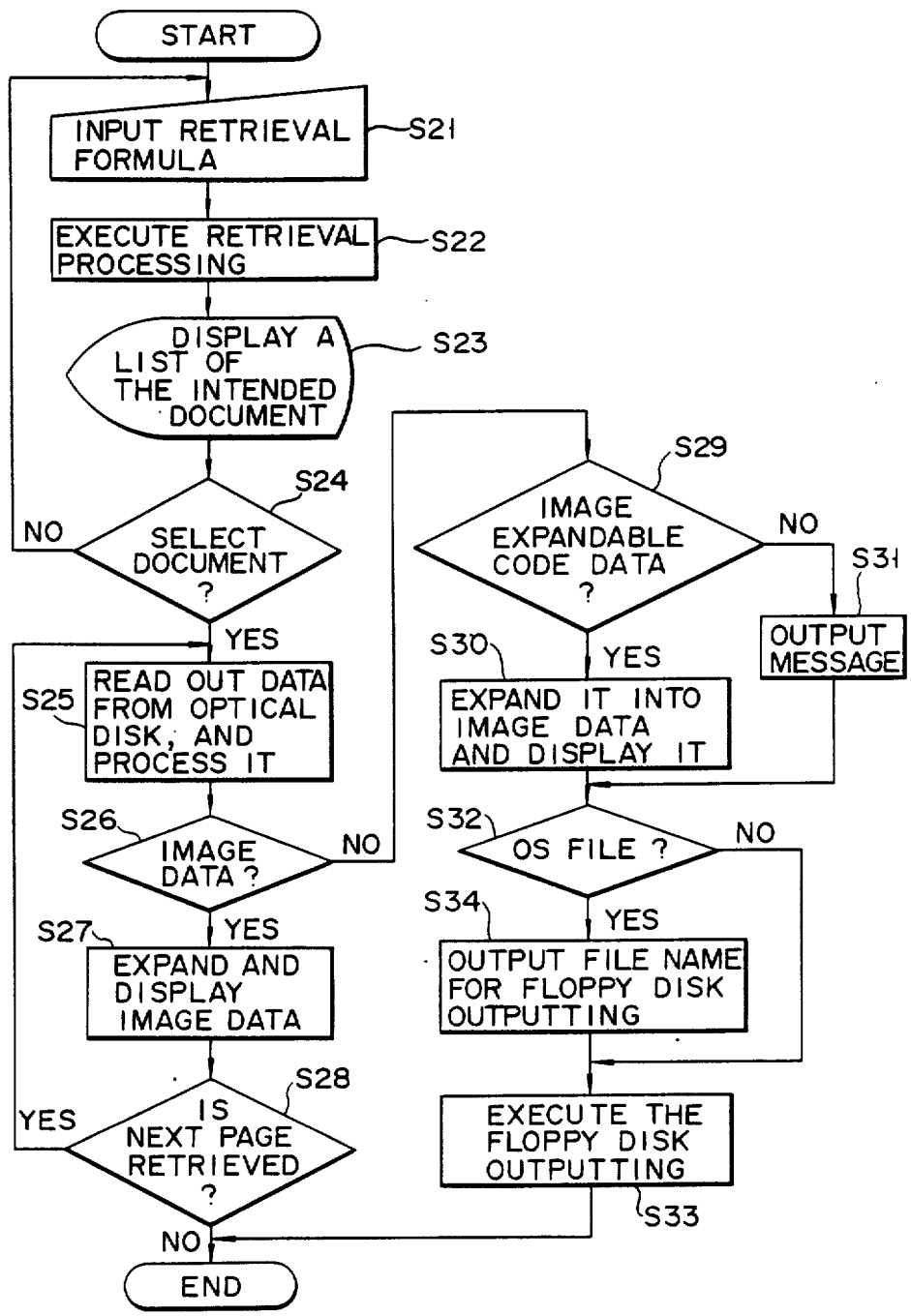
FIG. 12 shows a flow chart useful in explaining an overall flow in the data retrieval processing.

A retrieval processing will be described referring to a flowchart shown in FIG. 12.

A retrieval formula is entered (step S21). A retrieval processing is performed using the retrieval data stored in magnetic disk 27a (step S22). A list of the related documents is displayed (step S23). If a desired document name is not found (step S24), the retrieval formula is entered again (step S21). If found (step S24), an operator selects the document name from the document list and directs the filing apparatus to execute the retrieval.

Then, the information processing apparatus reads out the first page data of the selected document from optical disk 19 (step S25). In step S26, check is made to determine whether the read out data is the image data or not, referring to the kind flag in the data header part (step S26). If the answer is YES, the data is expanded and then displayed by CRT display device 24 (step S27). If the next page retrieval is needed (step S28), the sequence of the above steps is repeated from step S25.

If the decision result in step S26 is NO, control goes to step S29 to check the kind flag of the data header part. If the flag represents an image expandable code data, the code/image converter 12b converts the code data into the image data and CRT display device 24 displays the image data (step S30). If the code data is not image expandable, a message to that effect is displayed by CRT display device 24 (step S31).

Then, the data is output to floppy disk 28a. Before this outputting, control checks if the code data is of the OS type (step S32). If the answer is NO, the data is output to the whole of the floppy disk (step S33). If YES, the file name is designated (step S34), the data output is applied to that file in the floppy disk 28a (step S33).

Processing an FD read-in processing in the above registration mode will be described with reference to FIG. 13.

When a FD read-in processing is called from the registration processing, the information processing apparatus requests that an operator select either of a general file and a specific application file, while presenting a display for mode selection on the screen of display device 24, as is shown in FIG. 13. The operator selects a desired mode from those displayed items by mouse 29 or keyboard 23 (FIG. 1).

If the operator selects the general file, the display is changed to a display for a general file as is shown in FIG. 14. Description of the selected specific application file will be given later.

The FD read-in processing when the general file is selected, will be described referring to flow charts of FIGS. 14 and 15, and the displays of FIGS. 16 through 20.

An operator sets floppy disk 28a loaded with data, in floppy disk device 28 (step S41). Then, he selects the type of a floppy disk to be used. To this end, he selects either of FD5.25 and FD3.5 in item [Device] on the display screen of FIG. 14, by means of keyboard 23 or mouse 29. Further, he selects the type of the OS used when the data was stored into the floppy disk (step S42). Control accesses the floppy disk 28a, and reads out the volume name and the directory list data from the floppy disk (step S43), and stores them into main memory 13 while displaying them on CRT display device 24 (step S44).

The operator selectively points out a series of directive items while seeing the display, by keyboard 23 or mouse 29 (step S45). [Module Type] including "General file" and "Volume" is first pointed out. Either "General file" or "Volume" is selected. Following this, icons [Check Display], [Module Select], and [Module Delete], or [End] are selected in this order.

When icon [Check Display] is pointed out (step S46), a check display processing is executed (step S47). As the result of this processing, the dump data is converted into image data by code/image converter 12b, and is displayed. As is shown in a check display processing flow chart of FIG. 17, when the "General file" is selected as the type of module (step S61), an operator selects a file to be checked from the directory list (step S62). The entire data of the selected file are read out from floppy disk 28a (step S63), and are displayed by display device 24 (step S64). When "Volume" is selected (step S61), no check display processing is performed.

When icon [Module Select] is pointed out (step S48), the module select processing is executed (step S49). As is shown in a module select processing flow chart of FIG. 18, an operator selects one file from the displayed directory list (step S71). When the selected module type is the general file (step S72), the contents of the file bearing the file name selected are loaded into page memory 14 (step S73). The management data of that file is additionally stored into module management data area $13_1$ (step S74), and the data header is additionally stored into data header part area $13_3$ of main memory 13 (step S75). The file name is added to the module list on the display screen of display device 24, so that the number of modules is increased by one (step S76).

In the display shown in FIG. 14, two modules are selected. Internally, the file as loaded is managed by the module management data and header management data in main memory 13 (see FIG. 10). In this case, the kind flag of the sub-header in data header are $13_3$ is set to the general file. The data size, OS flag, device flag, and directory entry and the like are set.

When icon [Module Delete] is pointed out (step S50), a module delete processing is performed (step S51). As a result, the module already selected is deleted. As is seen from FIG. 19 showing a module delete processing flow chart, an operator selects a file to be deleted from the directory list (step S91). The number of modules is decreased by one and the corresponding header is deleted (step S92). Further, the corresponding module management data is deleted (step S93). Finally, the module name is removed from the module list being displayed on the screen (step S94).

When the operator points out icon [End] (step S52), an end processing is performed (step S53). As seen from FIG. 20 showing an end processing flow chart, the data address and size, and the number of modules in header management data area $13_2$, the address and size of the data for page memory 14 as stored in module management data area $13_1$, and additionally a key word to be stored in magnetic disk 27a, for example, file name, are transferred to filing processing module 13a (step S101). All the module management data in main memory 13 are erased (step S102), and the end processing is completed.

In a display of FIG. 15, "Volume" is selected for the "Module Type". The operation of this mode is similar to that when the general file is selected. The difference between them resides in a sequence of operation steps, which results from selection of "YES" for "Directory list". The selection of "YES" sets the directory list data in the option area of the sub-header. The directory list data will be used in a retrieval mode.

In the module select processing flow chart as is shown in FIG. 18, if "Volume" is selected (step S72), the data of all the tracks of the designated device (floppy disk 28a) are loaded as module data into page memory 14 (step S78). The management data for that data is additionally stored into module management data area $13_1$ in main memory 13 (step S79). The data header is additionally stored into data header area $13_3$ of main memory 13 (step S80). At this time, if the directory list flag is "YES" (step S81), the directory list data is set in the option area in the sub-header part as stored in main memory 13 (step S82). Further, the selected module is additionally listed in the module list on the display (step S76).

As a matter of course, the general file and the volume module may coexist.

An FD write-in processing as called from the retrieval processing will now be described. Flow charts shown in FIGS. 21 to 24, and displays shown in FIGS. 25 and 26 will be used for the description.

In a retrieval mode, when data is read in from optical disk 19, if the data is the code data, it is read in page memory 14. At this time, if the image expandable flag is set, the data can be displayed. When an operator directs the apparatus to write the code data into floppy disk 28a, filing processing module 13a requests FDR/W processing module 13c to write the data into floppy disk 28a according to the direction by the data header portion.

Figure 25:
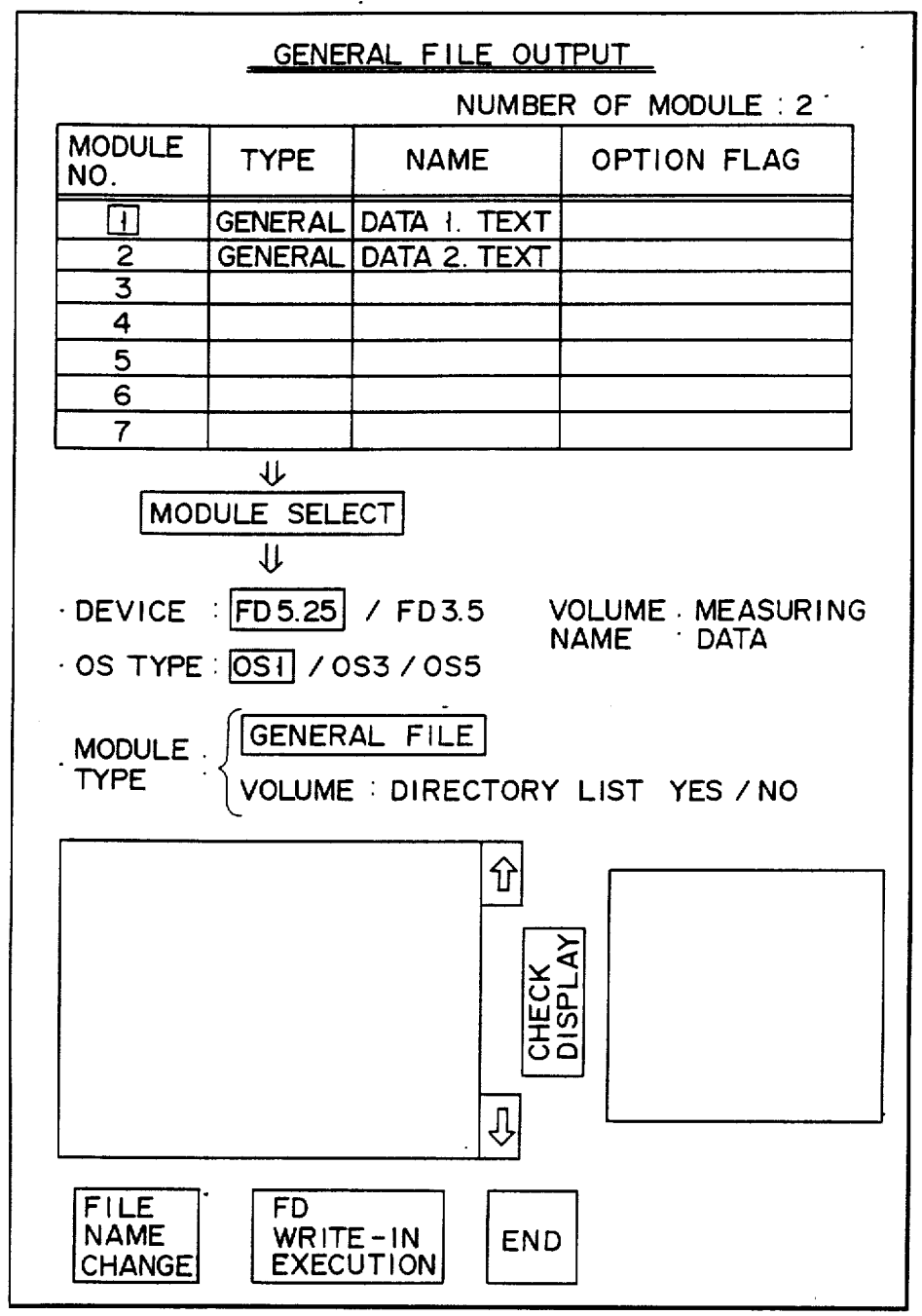
FIGS. 25 and 26 show displays used for FD write-in processing.

The write-in processing to floppy disk 28a further calls the general file output or the specific application file output by the kind flag in the sub-header part. FIG. 25 shows a display for the kind flag indicating the "General file". Description of the specific application file will be given later.

Upon calling of the general file output processing, the data header picks up the type of each module and the file name (step S111 in FIG. 21). In turn, CRT display device 24 displays the display shown in FIG. 25, including a module list (step S112). Incidentally, the display of FIG. 25 is obtained when an operator retrieves the data that is registered into optical disk 19 by using the FIG. 14 display.

The operator selectively points out directive items on the display by using keyboard 23 or mouse 29 (step S113). When icon [Module Select] is pointed out (step S114), the module select processing is performed (step S115). As is shown in FIG. 22 showing a module select processing flow chart, the operator selects one of the modules (step S131). More specifically, the operator sees the module list on the FIG. 25 display containing two types of modules, and selects a desired module by pointing out at it using keyboard 23 or mouse 29. Upon selection of the module, the device, the type of OS, and the type of the module are read out from the sub-header in main memory 13 (step S132) and are displayed (step S133). In the case of the general file (step S134), control terminates the module select processing, and returns to the general file output processing.

When icon [Check Display] is designated (step S116 in FIG. 21), the check display processing is performed. The result is that code/image converter 12b converts the dump data of the module data into the image data, and transfers it to display device 24 for display. As seen from a check display processing flow chart of FIG. 23, the sub-header of the selected module is read out from main memory 13 (step S141), the address and size of the data in optical device 19 is read out from the sub-header (step S142). Control reserves a memory area amounting to the data size in page memory 14, and transfers the data address and size to ODR/W processing module 13d. This module 13d loads the data into page memory 14 (step S143). The data is also displayed on the display (step S144).

When icon [FD Write-in Execution] is selected (step S118), it is executed (step S119). The result is to write the data into floppy disk 28a. If the file name change is decided, the file name of the file written into floppy disk 28a can be changed to the file name that was used in the data registration.

Figure 24:
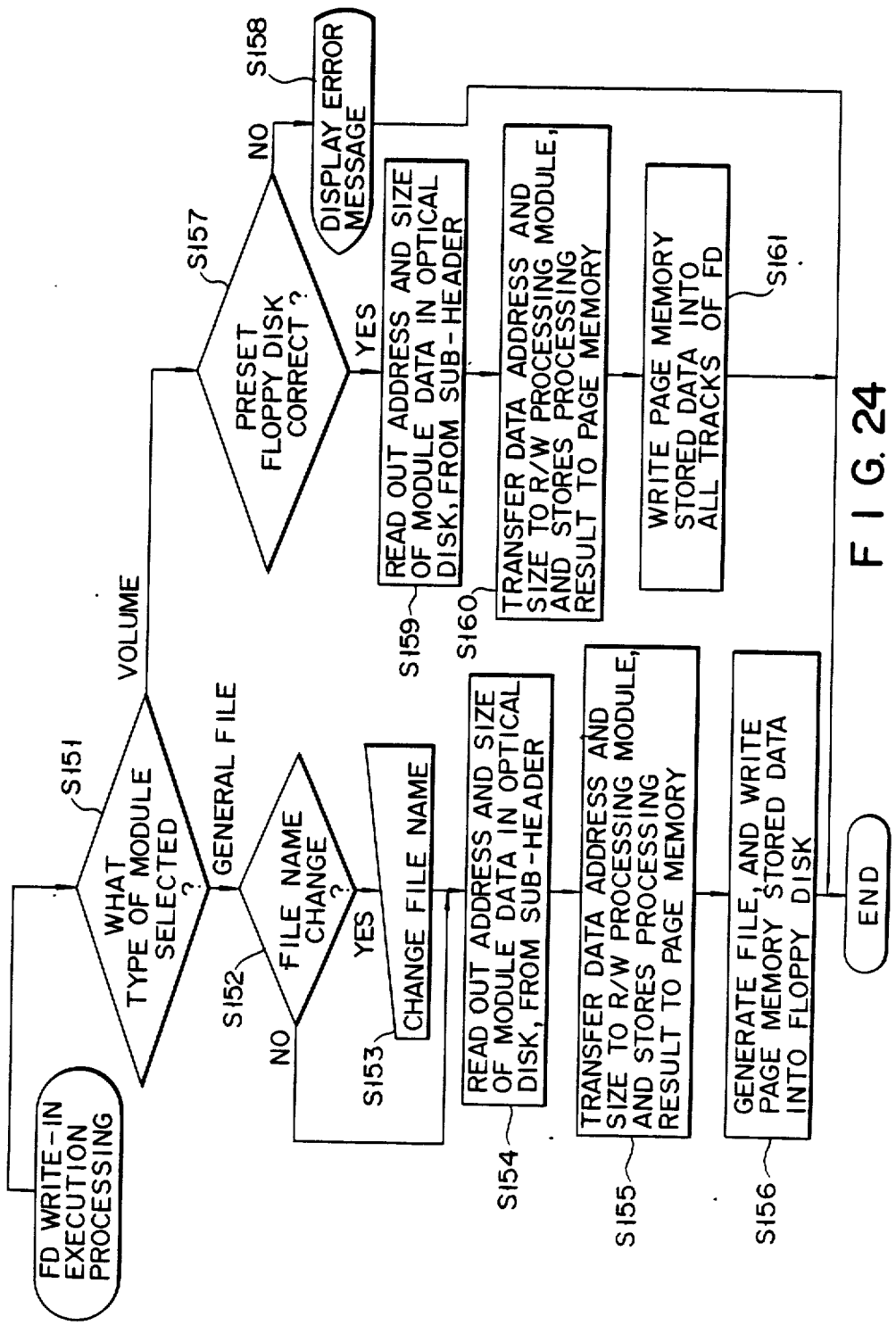

Reference is made to FIG. 24 showing a flow of the FD write-in execution processing. If step S151 gives the answer of the general file, another step S152 asks an operator to decide whether the file name is changed or not. If the answer is YES, the operator enters to a new file name (step S153). Control reads out the address and size of the data of optical disk 19 from the sub-header (step S154). Control reserves the memory area amounting to the data size in page memory 14 and transfers the data address and size to ODR/W processing module 13d. This module 13d loads the data into page memory 14 (step S155). The data is also converted into the code data by code/image converter 12b, and loaded into floppy disk 28a (step S156).

When icon [File Name Change] is decided (step S120 in FIG. 21), the file name change processing is performed (step S121). When icon [End] is selected (step S122), the output processing of the general file ends.

Figure 26:
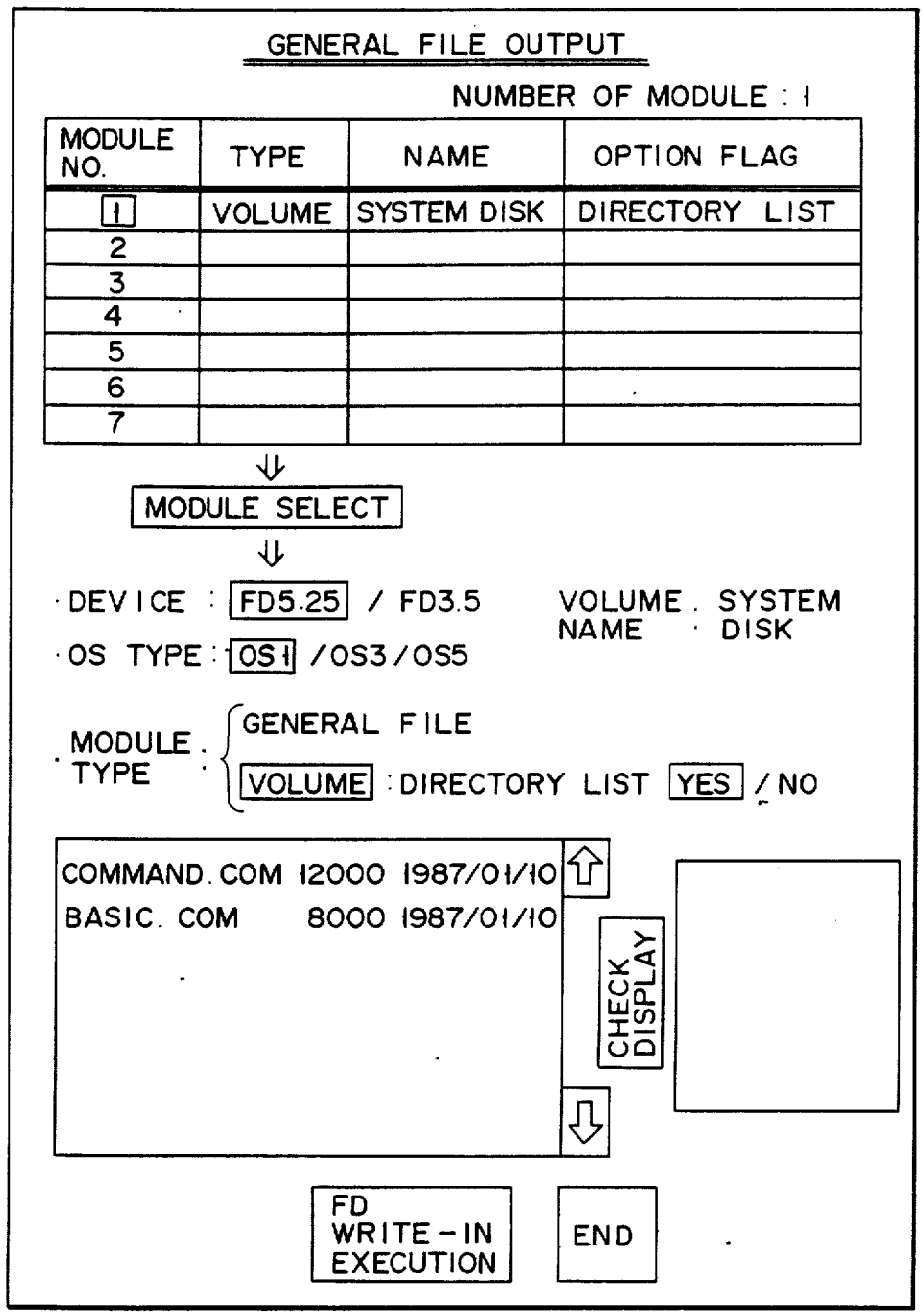

FIG. 26 shows a display when "Volume" is selected for the type of module. The processing for this type of module is similar to that when "General file" is selected, except that the "Directory list" flag of FIG. 26 is "YES". In the case of "YES", when icon [Module Select] is selected, the directory list stored in the option area of the sub-header is presented on the display. This may be referred to when the data is output to floppy disk 28a. As seen from a module select processing flow chart of FIG. 22, when the device, type of OS, and type of the module are displayed (step S133), it is assumed that "Volume" is selected (step S134), and the directory list flag is "YES" (step S135). In this situation, the directory list data is read out from the option area of the sub-header (step S136), and is presented on the display (step S137).

In the FD write-in execution mode, if "Volume" is selected for the type module (step S151 in FIG. 24 showing the FD write-in execution processing flow chart), the device (floppy disk 28a) used in the registration is compared with the device currently used (step S157). When these are not coincident, an alarm message is displayed by CRT display device 24 (step S158).

When coincident, the data of all the tracks of the device is loaded into the present device or disk. The address and size of the data in optical disk 19 is read out from the sub-header (step S159). In the next step S160, control reserves a memory area amounting to the data size in page memory 14 and transfers the data address and size to ODR/W processing module 13d. This module 13d loads the data into page memory 14. The data is converted into the code data by code/image converter 12b, and the converted code data is loaded into floppy disk 28a. In this way, the data in page memory 14 are written into all of the tracks of floppy disk 28a (step S161).

Alternatively, one file is selected from the directory list, and the selected file alone is written into floppy disk 28a.

A registration/retrieval processing of a specific application file will now be described. The registration of the CAD drawing data prepared by a personal computer will first be discussed referring to FIG. 27. In the mode of registering the specific application, an operator sees a property sheet on the display, and selects a desired specific application file (step S171). Upon that selection, related or intended files are searched (step S172). If an intended file is not found (step S173), an error message such as "Exchange the floppy disk for another" is given on the display (step S174).

Figure 28:
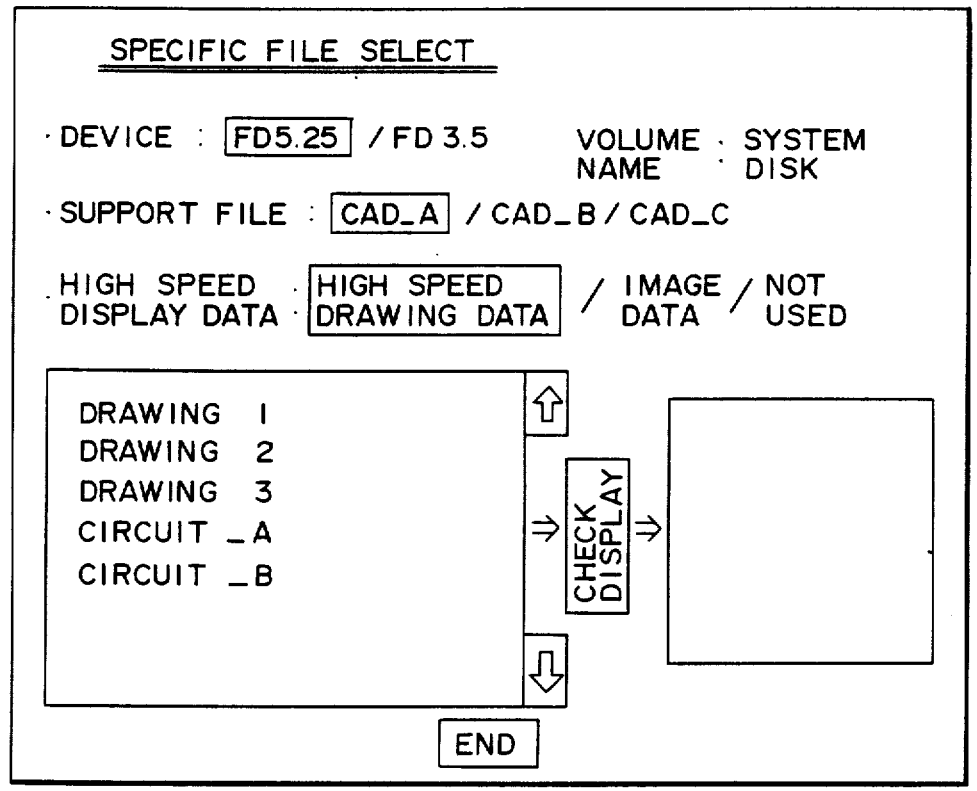
FIGS. 28 to 30 show property sheets used in the specific file select processing.

When control succeeds in searching the related files, viz., the related files are found, if the additional use of a high speed display file is not needed (step S175) (this is designated by pointing out "not used" in item [High Speed Display Data] by mouse 29 or keyboard 23 in FIG. 28) the header for the related files is prepared (step S176), and those related files including that with the prepared header are merged (step S177). The data of the merged file is written into the optical disk (step S178). Control transfers the selected file name, proper data, identifying flags to filing processing module 13a (step S179), and terminates this processing.

In step S175, if the additional use of high speed display is needed, and more exactly "image data" is selected, the data is expanded into the image data (step S180) (this designated by pointing out "Image data" in [High Speed Display Data] in FIG. 28) and the image data is also merged (step S177). If the "High speed drawing" is selected as in the designation of the above items, the high speed drawing data is generated (step S181) and the generated data is also merged with the files (step S177).

The registration of the specific application will further be described. When the registration of the specific application is directed, a specific application file processing module presents a property sheet on the display as is shown in FIG. 28. After seeing this property sheet, an operator selects a file name supported by this specific application file processing module by using mouse 29, for example. Upon this selection, a list of file names with properties such as CAD are displayed as shown.

Figure 29:
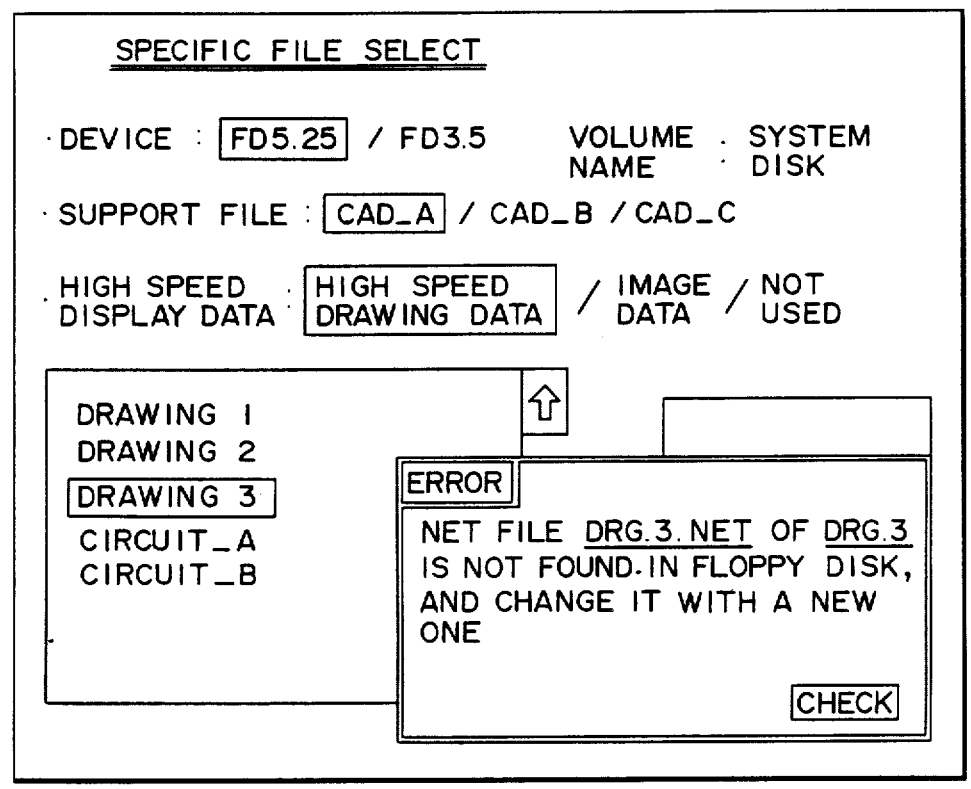

As already mentioned, a sheet of drawing contains a plurality of related files. Normally, the same file name attached with appropriate property symbols, such as ABC, and XYZ, are applied for these files. The different file names will be found on the file display, with omission of the property symbols In some CAD systems, these files are listed in another directory or stored in another floppy disk 28a. Therefore, when the intended file cannot be searched as in step S174 in FIG. 27, an error message is presented as is shown in FIG. 29, and calls upon an operator to change the present disk to another.

Figure 30:
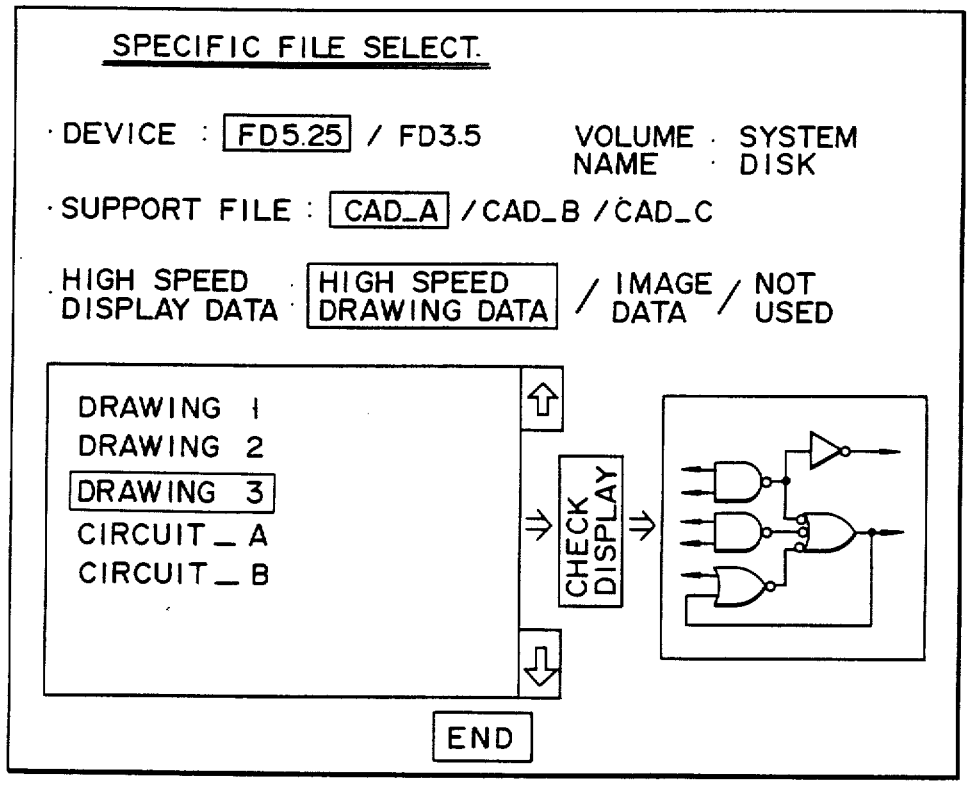

When icon [Check Display] is selected as in the case of the general file, the designated drawing is displayed as is shown in FIG. 30. At this time, this specific application file processing module searches an image expandable file with the designated file name, and expands it into the image.

As described with reference to step S176 in FIG. 27, the directory name, volume name, and type of media of each file, and the properties of each file such as file name, file size, and date of data preparation are picked up and assembled into the document management system.

For reliable and effective data retrieval, it is necessary to check to see whether the retrieval file to be loaded into floppy disk 28a is correct or not before it is loaded into the disk. In connection with this, the information processing apparatus under discussion presents a drawing developed on the display and this improves the operability of the filing apparatus. For developing the CAD drawing on the display, the utility routine to execute the image expansion must be prepared for each CAD. Practically, therefore, it is almost impossible to expand all types of CAD drawings into the image. The measure for this to use identifying flags to indicate the type of CAD used for the drawing data, and to indicate if the image expansion of the drawing data is possible, at the stage of registration. With the measure, when reading out the file with such identifiers by an information processing apparatus, an operator may determine whether the file can be image expanded or not by the used filing apparatus.

At the time of retrieving the drawing data, it is desirable to display of drawings at high speed. Even if the function to image expand the original data by CAD is supported by the information processing apparatus, much time consumed for expanding the data into the image would considerably damage the operability of the processing apparatus. This problem becomes more serious for very large drawings. To solve this problem, some measure must be taken for the display of the CAD drawing data when it is retrieved.

To achieve this, in the information processing apparatus according to this invention, the plurality of CAD data are registered together with a file so formatted as to allow a high speed display of the CAD data. This is realized by two methods of steps S181 and S180 of FIG. 27. The first method of step S181 is to convert the CAD original file into the high speed drawing data so formatted as to allow the hardware/firmware for drawing processing to be operable most efficiently, and to store the CAD files together with the generated data. The display speed by this method depends on the performance of the hardware/firmware used. The second method of step S180 is to transform or expand the CAD original data into the image data, and to additionally use the image data as intact. As in the step S175 described in connection with the property sheet of FIG. 28, the second method is executed in the following manner. Either of the two types of data, both of them, or none of them is selected and additionally used. When the CAD drawing data is used for fixed purposes, this selection may be made automatically if the selecting procedure is programmed. The selection may be programmed by software, the CAD drawing data whose use is almost fixed. Further, a combination of the manual selection and the software selection may be used, if necessary.

As described above, different types of files describing one sheet of drawing are systematically arranged and handled as a batch of data for storage and management. There are various methods to realize this document management. In the first method for the document management, various drawing data are arranged into documents each with title or key word and note. These properties are used to define an identifier to indicate the drawing data of the same drawing, by using these properties. In the second method, various data are arranged into pages. With the data of one drawing within one document, the data is stored at the memory location assigned to the page number. In the third method, related files are merged into unit data. The unit data is treated as one page. Further, the type of data is changed for each binder. Combinations of the above methods also may be allowed. The above methods may be supported by the filing apparatus according to this invention. In such a case, any of the methods to be used may be selected manually. Further, the selection may automatically be made by a software technique. The above-mentioned embodiment employs the automatic selection.

In the first method, i.e., the data file of one drawing is made to correspond to one document, when the data registration is executed, the work sheet file of that drawing is registered as a first page. Then the net data file and the plot file of the drawing are registered in the next page, and further the data file for high speed retrieval display is registered in response to the instruction by an operator, as described above. Some operation or operation specification require that the first page data is used as the image expandable data. Satisfactory outputting of the data to the floppy disk requires that the former order is employed. Any of the following ordering methods may be used: (1) the order is determined case by case, (2) it is determined by an instruction by an operator, and (3) the system determines the order.

In any of the above registering orders, the registered data are each necessarily followed by the following property data; directory name, volume name, type of media, file name, file size, date of preparation, flag to indicate if the application software is used for data preparation, data to indicate if the registered data is expandable to an image, flag to indicate the type of CAD used, and yes or no for use of the high speed display file. The data are registered page by page automatically or after check by an operator.

In the second method, i.e., that the data files relating to one sheet of drawing are merged together into one page, when the data registration is executed, the data registration is performed in a similar way, except that the data files are merged. Further, this method uses additional property concerning the merge, for example, the number of merged files and boundaries of the merged files.

The information processing apparatus according to this invention may register the data as prepared by every type of personal computer. When the data registered is retrieved, the compatibility of the apparatus with a floppy disk to be loaded with the retrieved data, must be checked. To this end, a flag to indicate the type of the OS of the personal computer by which the CAD data was prepared is further used for the property data.

The specific application processing of the embodiment as mentioned above is based on the latter method. Specifically, the work data file, net data file, plot data file, and further high speed drawing data are merged together. The merged data is stored into the data part of the optical disk format shown in FIG. 5. The image expandable files, data properties, identifying flags are stored into the sub-header part. When an operator points out icon [End] in the FIG. 30 property sheet, and checks the registered files, this processing is automatically performed by the specific application file processing.

The identifying flag to indicate the high speed display file is stored to the option area of the sub-header of FIG. 9. It is further stored as the data to indicate the structure of the sub-header in the application flag or the reserve area of the main header of FIG. 6.

The CAD drawing data frequently describes a configuration of a figure by combining predetermined parts. These parts are screws, nuts, etc. for mechanical CAD, and general ICs, resistors, capacitors, etc. for electrical CAD. In CAD, an entire drawing is generated by selecting symbols and entering relative positions of the symbols. This type of CAD needs the data indicating the symbols in addition to the data describing the relative positions and connections. For this reason, for registering the CAD drawing data, the symbols used are also registered. A general CAD uses two types of symbols, general symbols and symbols for special parts. The general symbols are used by every type of CAD. In registering the CAD drawing data, it is only needed to add the symbols for special parts alone. In the present embodiment, only the part symbols other than the general symbols as designed by users are additionally used when the data is registered.

In case that a data registration mode, appropriate code data is written into the optical disk as in the information processing apparatus under discussion, a high reliability is required for the code data to be written. Therefore, it is desirable to check the code data before it is loaded into the optical disk. In this case, the most reliable check is to read out the stored data from the optical disk, and to compare it with the original data. The processing apparatus under discussion employs three check methods which are selectively used depending on the apparatus composition used. These will be described referring to FIGS. 31 to 33.

It is assumed now that the data to be registered is stored in page memory 14. The first method to first be discussed is suitable for the apparatus whose page memory 14 has a sufficient memory capacity. As is shown in FIG. 31, a memory area amounting to the data size of the registered data (original data) is reserved in page memory 14. After loaded into optical disk 19, the data is read out from the disk, and loaded into page memory 14. The read out data and the original data are compared in page memory 14, to check if these are coincident or not.

The second method uses interface circuit with a comparative verifying function, as is shown in FIG. 32. With this function, in place of loading the data of optical disk into page memory 14, the original data to be written into the page memory is read out and subjected to the comparison.

The third method shown in FIG. 33 modifies page memory 14 so as to have a raster conversion processing function. In this method, the data as read out from optical disk 19 is loaded into page memory 14, while being exclusively ORed with the original data. The result of the exclusively ORing operation shows "0" when both data are coincident with each other, but shows a logical value other than "0" when both data are not coincident. Therefore, a determination of whether the operation results are all "0" suffices for the registered data check. When both data are not coincident, the data must be registered again. In this case, since the original data are destroyed when it is read out, it must be restored into the correct data by reading out it from the optical disk and writing it into the page memory through the Ex-OR logic. Alternatively, before read out, the original data may be stored in floppy disk 28a or magnetic disk 27a.

As for these check methods, the information processing apparatus according to this invention is arranged that a check mechanism to be operated, and the function used when it is operated are designated in advance by an operator on the basis of the apparatus composition.

The property data of the data, when registered, is preferably stored into magnetic disk 27a for managing one document. The application software is designed so that after the data registration processing ends, the above data is returned as return values to filing processing module 13a, so as to allow the property data to be input to MD processing module 13f. This processing is similar to that for the general file processing.

Figure 34:
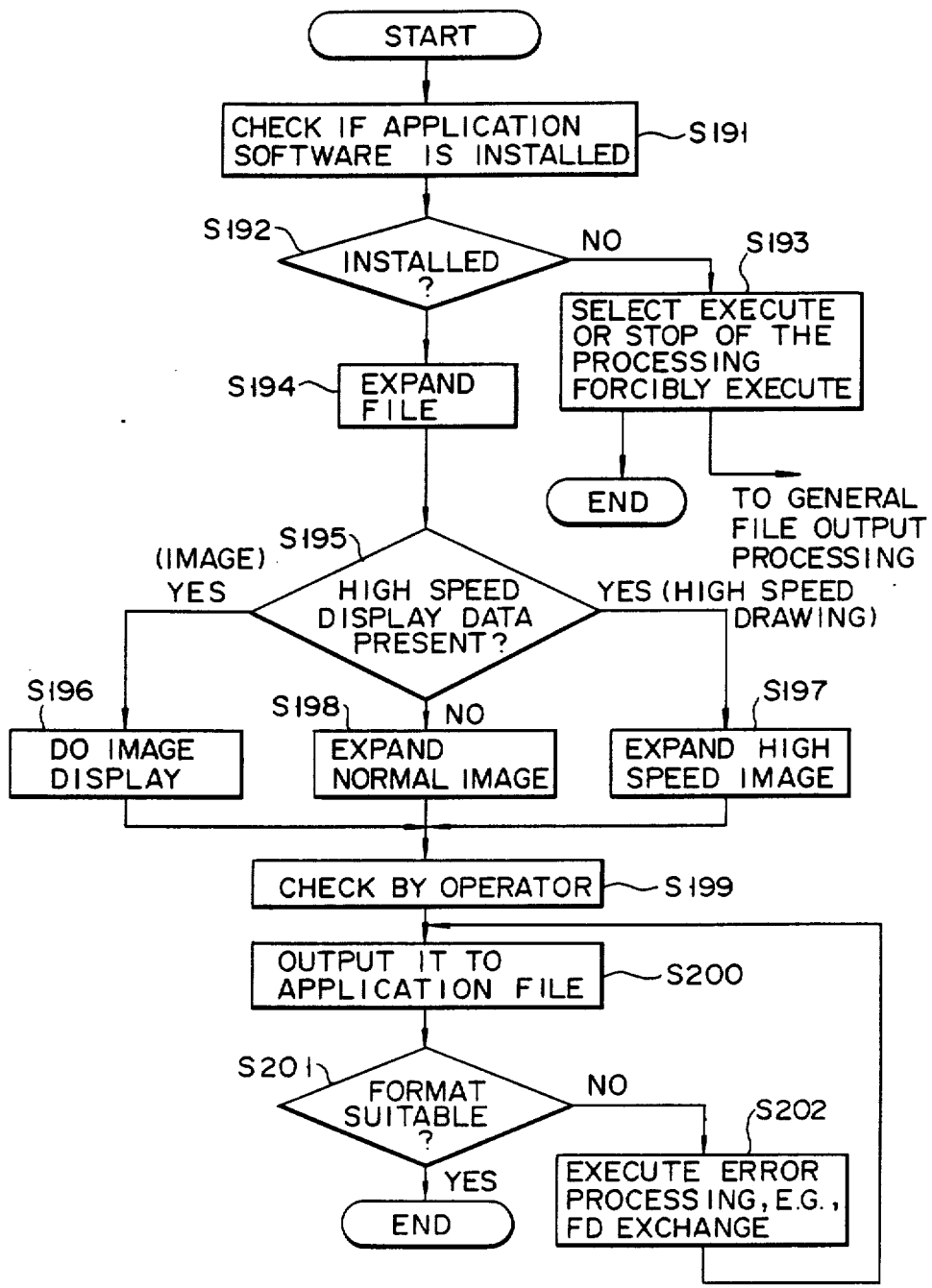
FIG. 34 shows a flow chart for explaining a control flow in the retrieval processing for the specific application files.

Retrieval of the drawing data will be described referring to FIG. 34. Control causes filing processing module 13a to retrieve the document by the ordinary procedure. At this time, the retrieved document is checked to determine whether these are the normal image data. If not, a decision is made as to whether or not the document is the specific application file, referring to the identifying flag described in that data. If it is not the specific application file, the general file processing is performed.

When decision is made that the present document is the specific application file, control checks if a software for executing the processing of the data is installed in the processing apparatus (step S191). If not installed (step S192), control presents a message so indicating on the display, as is shown in FIG. 35, and asks an operator to forcibly load the application file as intact into a specific file according to the format of this apparatus or to not write the same (step S193).

When that software is installed, control expands the file according to the data structure as set at the time of its registration (step S194). In other words, the vector data supplied from floppy disk 28a is transformed into raster data (image data) by vector/raster converter 12a.

During the check of the retrieved data, which is performed in a normal retrieval mode, control picks up the option area of the sub-header, and check contents of the identifying flag to indicate if the high speed display data is present or absent (step S195). If it is present, control executes the image display (step S196) or the high speed image expansion (step S197). If it is not present, control executes the normal image expansion (step S198).

After an operator checks the data (step S199), the specific application file processing presents a property sheet, as is shown in FIG. 36 on the display, and requires an operator to select the device used. The property sheet shows the types of support apparatus by which the specific application file was generated, such as CAD-A, CAD-B, and CAD-C, and shows the expanded files. The application software automatically executes the following tasks: (1) to set the data respectively into files, (2) to register the data in designated directory, and (3) to record data into different floppy disks 28a (step S200).

When the data is recorded into floppy disks 28a, an operator will frequently encounter floppy disks with different OS formats from that of the retrieved data. This can be checked by the OS identifying flag. After it is checked, if the format is different (step S201), control presents an error message to that effect, and requires an operator to take action, for example, disk exchange and delete (step S202).

The remaining processings are substantially the same as those for the general file processing module.

The description of the specific application file to follow is the registration and retrieval of the document data (text file) by a word processor. The registration/retrieval processing of this type of document data, which is performed by code/image converter 12b, is substantially the same as to that of the CAD drawing data as mentioned above. When the document data contains special characters, such as externally resistered characters, the data of special characters may be registered. To this end, the processing apparatus is capable of displaying a property sheet, as is shown in FIG. 37. In registering the word processor document data, i.e., text data, an operator may elect to register foreign letters or not while viewing the displayed property sheet. In the usual text data management, the data containing a plurality of pages or text pages is registered into a single file. The data file is printed out page by page, divisionally. In the data management system according to this invention, however, one page is assigned to one file, as described above. The difference between these data management systems are removed by using the following two ways of processing: (1) when next/preceding page is designated on the retrieval display, the data are successively processed file by file, and (2) when next/preceding page is designated, the text data is successively updated page by page within the same file.

Figure 38:
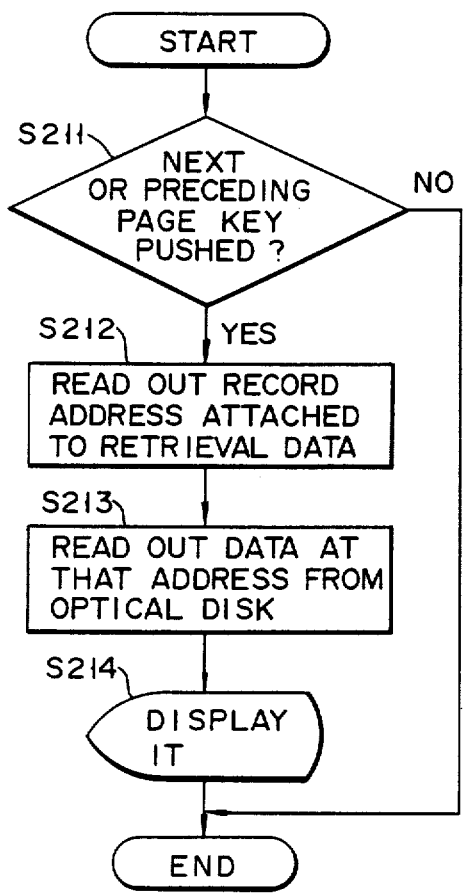
FIG. 38 shows a flow chart for explaining the page change processing.

The processing flow of the registration/retrieval of text data will be described referring to FIGS. 38 and 39. In FIG. 38, when the next page or the preceding page is designated (step S211), control reads out the address of the retrieved data (step S212). The data specified by the address is read out from optical disk 19 (step S213) and displayed on CRT display 24 (step S214).

Figure 39:
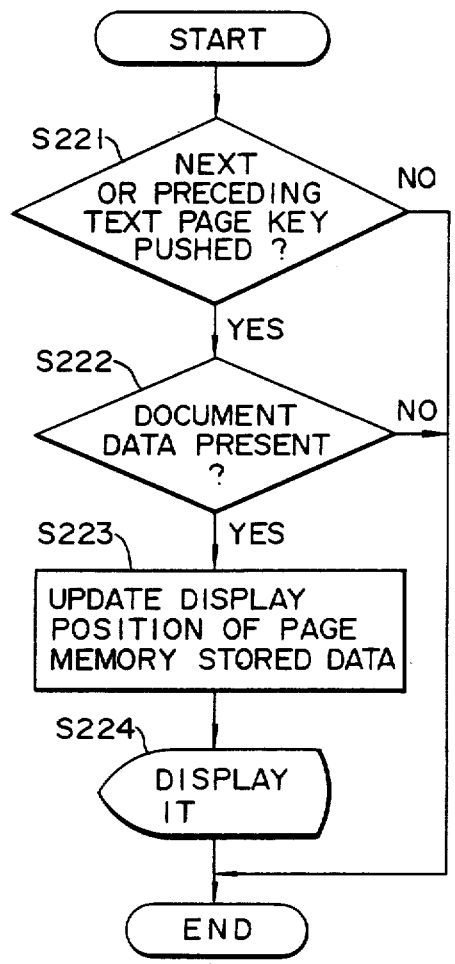
FIG. 39 shows a flow chart for explaining test page change.

In FIG. 39, when text next page of text preceding page is designated (step S221), control checks if the data currently displayed is the text data or not (step S222). If the answer is YES, the processing is made so that the display position of the present data of page memory 14 is shifted forwardly or backwardly by one page (step S223). Then, that data is displayed (step S224).

As described above, an information processing apparatus according to this invention is capable of smoothly handling the document data and drawing data stored in the floppy disk, like paper documents and drawings.

What is claimed is:

1. An information processing apparatus for processing code data, comprising:
   means for receiving a plurality of code data each having a data format inherent thereto;
   means, coupled to said receiving means, for associating each code data with management data including identification data representing the inherent data format; and
   means, coupled to said associating means, for storing the plurality of code data and the associated management data.

2. The information processing apparatus according to claim 1, further comprising means, coupled to said storing means, for retrieving the code data from said storing means.

3. The information processing apparatus according to claim 2, wherein
   said associating means includes means for associating each code data with retrieval data for retrieving code data stored in said storing means,
   wherein said storing means includes means for storing the associated retrieval data, and
   said retrieving means includes retrieval means for retrieving the code data by utilizing said retrieval data.

4. The information processing apparatus according to claim 3, wherein said retrieval means includes:
   means, coupled to said storing means, for inputting retrieval data; and
   means, coupled to said inputting means, for retrieving the code data associated with the retrieval data being coincident with the retrieval data input by said inputting means, and for outputting retrieved code data associated with the management data.

5. The information processing apparatus according to claim 4, further comprising check means, coupled to said retrieving means, for checking the inherent data format of the retrieved code data, referring to the identification data in the management data associated with the retrieved code data.

6. The information processing apparatus according to claim 5, wherein
   the management data includes flag data representing that the code data associated with the management data is character code data constituting document data or is vector code data constituting drawing data, and
   said checking means includes means for checking whether the flag data associated with the retrieved code data represents character code data or vector code data.

7. The information processing apparatus according to claim 6, further comprising memory means for storing the retrieved code data, and control means, coupled to said retrieving means and memory means, for storing the retrieved code data into said memory means when the flag data represents character code data.

8. The information processing apparatus according to claim 7, further comprising means, coupled to the retrieving means, for converting the vector code data into raster code data, and wherein said control means includes means, coupled to said converting means, for supplying the retrieved code data to said converting means when the flag data represents vector code data, and means, coupled between said memory means and converting means, for storing the raster code data from said converting means into said memory means.

9. The information processing apparatus according to claim 5, further comprising a first recording medium, coupled to said receiving means, for recording and supplying the code data to said receiving means;
   a second recording medium, coupled to said retrieving means, for recording the retrieved code data;
   display means, coupled to said storing means, for displaying information; and
   control means, coupled to said retrieving means and storing means, for controlling said display means, and
   wherein said associating means includes means for associating each code data with the management data including the identification data and flag data, the flag data representing a type and a recording density of the first recording medium,
   said checking means includes check means for checking the type and the recording density of said first recording medium referring to the flag data associated with the retrieved code data, and
   said control means includes means, coupled to said checking means, for verifying whether the type and the recording density of said first recording medium checked by said check means are equal to those of said second recording medium and for outputting a verification result; and means, coupled to said verifying means, for causing said display means to display an error message when the verification result shows that the type and the recording density of said first recording medium are not equal to those of said second recording medium.

10. The information processing apparatus according to claim 5, further comprising display means, coupled to said storing means, for displaying information and control means, coupled to said retrieving means and storing means, for controlling said display means, and wherein said associating means includes means for associating each code data with the management data including the identification data and flag data, the flag data representing the code data associated therewith that may be displayed, said checking means includes check means, coupled to said retrieving means, for checking whether the retrieved code data may be displayed referring to the flag data associated with the retrieved code data, and said control means includes means, coupled to said display means, for causing said display means to display said retrieved code data when a check result of said check means shows that said retrieved code data may be displayed.

11. The information processing apparatus according to claim 5, further comprising control means, coupled to said checking means, for controlling a plurality of processing means, and wherein said associating means includes means for associating each code data with the management data including the identification data and flag data, the flag data representing an operating system of the code data associated with the management data, said checking means includes check means, coupled to said retrieving means, for determining the operating system of said retrieved code data referring to the flag data associated with said retrieved code data, and said control means includes: said plurality of processing means for respectively executing processing according to one of a plurality of operating systems; and means, coupled to said processing means, for selecting one of said plurality of processing means according to the operating system as determined by said check means.

12. The information processing apparatus according to claim 2, wherein said receiving means includes reception means for receiving a plurality of image data and the code data, each of the image and code data having a data format inherent thereto, said associating means includes means for associating each of the plurality of image and code data with the management data including the identification data and flag data, the flag data representing whether data received by said reception means is the image data or the code data, said storing means includes memory means, coupled to said associating means, for storing the plurality of the image and code data and the associated management data, and said retrieving means includes retrieval means, coupled to said memory means, for retrieving ones of the plurality of image and code data from said memory means and for outputting retrieved data.

13. The information processing apparatus according to claim 12, further comprising means, coupled to said retrieval means, for checking whether the retrieved data is the image data or the code data, referring to the flag data contained in the management data associated with the retrieved data and for outputting a check result.

14. The information processing apparatus according to claim 13, further comprising:

means, coupled to said storing means, for expanding data;

means, coupled to said data expanding means, for displaying data expanded by said expanding means; and control means, coupled to said retrieving means and data expanding means, for supplying the retrieved data to said expanding means when the check result output from said checking means shows that the retrieved data is the image data.

15. An information processing apparatus for processing code data, comprising:

means for supplying a plurality of code data, each code data having a data format inherent thereto;

means, coupled to said supplying means, for storing the plurality of code data supplied from said supplying means; and means, coupled to said storing means, for checking whether or not the plurality of code data having the inherent data format have correctly been stored, when the code data is stored into said storing means.

16. The information processing apparatus according to claim 15, wherein said checking means includes;

memory means, coupled to said supplying means, for storing the code data supplied from said supplying means;

means, coupled to said storing means, for reading out the code data from said storing means; and means, coupled to said memory means and reading means, for comparing the code data having the inherent data format stored in said memory means with the code data read out by said read-out means.

17. The information processing apparatus according to claim 15, wherein said checking means includes:

first memory means, coupled to said supplying means, for storing the code data supplied from said supplying means;

means, coupled to said storing means, for reading out the code data from said storing means;

second memory means, coupled to said reading means, for storing the code data read out by said read-out means; and means, coupled to said first and second memory means, for comparing the code data stored in said first memory means with the code data stored in said second memory means.

18. The information processing apparatus according to claim 15, wherein said checking means includes:

memory means, coupled to said supplying means, for storing the code data supplied from said supplying means;

means, coupled to said storing means, for reading out the code data from said storing means;

means, coupled to said reading means and memory means, for applying an exclusive OR operating to the code data read out by said read-out means and the code data stored in said memory means, and for replacing the code data in said memory means with results of said exclusive OR operation; and means, coupled to said applying means, for checking whether the results of said exclusive OR operation stored in said memory means are all "0's".

19. An information processing apparatus for processing code data, said apparatus comprising:

means for storing a plurality of code data each having a data format inherent thereto and identification data representing the inherent data format;

means, coupled to said storing means, for retrieving the code data from said storing means; and means, coupled to said retrieving means, for checking the inherent data format of the code data retrieved by said retrieving means, referring to the identification data of the code data retrieved by said retrieving means.

* * * * *

UNITED STATES PATENT AND TRADEMARK OFFICE
CERTIFICATE OF CORRECTION

PATENT NO. : 4,964,039

DATED : October 16, 1990

INVENTOR(S) : Koji Izawa et al.

It is certified that error appears in the above-identified patent and that said Letters Patent is hereby corrected as shown below:

Column 1, Line 25, after "data" delete ",";

Column 3, Line 26, change "the" to --a--;

Column 3, Line 28, after "explaining" insert --a--;

Column 3, Line 68, delete " / ";

Column 6, Line 13, change "13c" to --13e--;

Column 10, Line 15, after "S26," insert --a--;

Column 12, Line 57, delete "out";

Column 13, Line 21, delete "to";

Column 13, Line 29, after "12b" delete " , ";

Column 14, Line 53, after "symbols" insert --.--;

UNITED STATES PATENT AND TRADEMARK OFFICE
CERTIFICATE OF CORRECTION

PATENT NO. : 4,964,039
DATED : October 16, 1990
INVENTOR(S) : Koji Izawa et al.

It is certified that error appears in the above-identified patent and that said Letters Patent is hereby corrected as shown below:

Column 16, Line 38, delete "that";

Column 19, Line 4, delete "to";

Claim 16, Column 22, Line 32, after "includes" change ";" to --:--;

Claim 18, Column 22, Line 64, change "operating" to --operation--.

Signed and Sealed this

Twelfth Day of January, 1993

Attest:

DOUGLAS B. COMER

Attesting Officer

Acting Commissioner of Patents and Trademarks